(12) United States Patent
Mita

(10) Patent No.: US 8,405,867 B2
(45) Date of Patent: Mar. 26, 2013

(54) IMAGE FORMING APPARATUS, METHOD, AND CONTROL PROGRAM FOR REARRANGING PRINT ORDER

(75) Inventor: Yoshimi Mita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 479 days.

(21) Appl. No.: 12/685,824

(22) Filed: Jan. 12, 2010

(65) Prior Publication Data

US 2010/0177346 A1   Jul. 15, 2010

(30) Foreign Application Priority Data

Jan. 13, 2009   (JP) ................................. 2009-004640

(51) Int. Cl.
*G06F 3/12*   (2006.01)
(52) U.S. Cl. ...................... 358/1.18; 358/1.12; 358/1.13; 358/1.15

(58) Field of Classification Search ................. 358/1.15, 358/1.12, 1.13, 1.18
See application file for complete search history.

(56) References Cited

U.S. PATENT DOCUMENTS

| 2006/0187488 A1* | 8/2006 | Sakamoto | 358/1.18 |
| 2008/0165383 A1* | 7/2008 | Myoki | 358/1.15 |

FOREIGN PATENT DOCUMENTS

| JP | 2000-187580 A | 7/2000 |
| JP | 2007-226465 A | 9/2007 |
| JP | 2008-269262 A | 11/2008 |

* cited by examiner

*Primary Examiner* — Qian Yang
(74) *Attorney, Agent, or Firm* — Canon U.S.A., Inc. IP Division

(57) ABSTRACT

An apparatus includes a division unit configured to divide the print job into a plurality of data pieces, and a definition unit configured to define an object used for each of the divided data pieces as a reusable object which can be used by each piece of data.

20 Claims, 24 Drawing Sheets

FIG.15
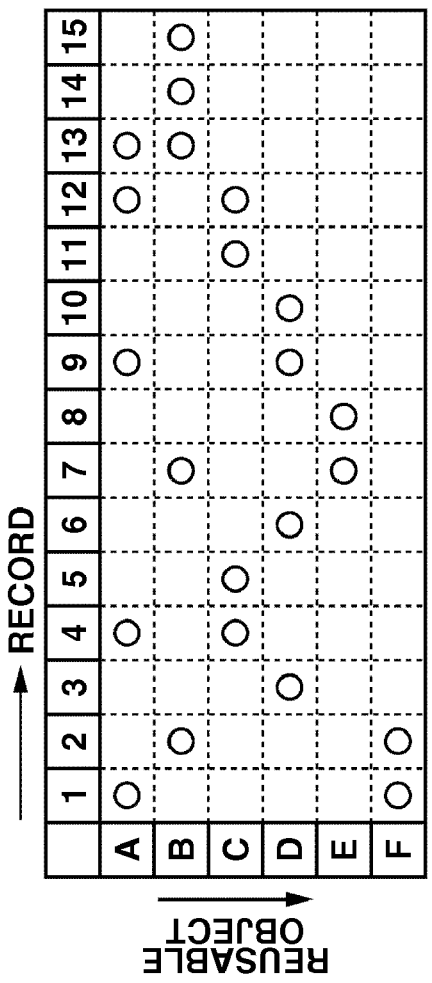
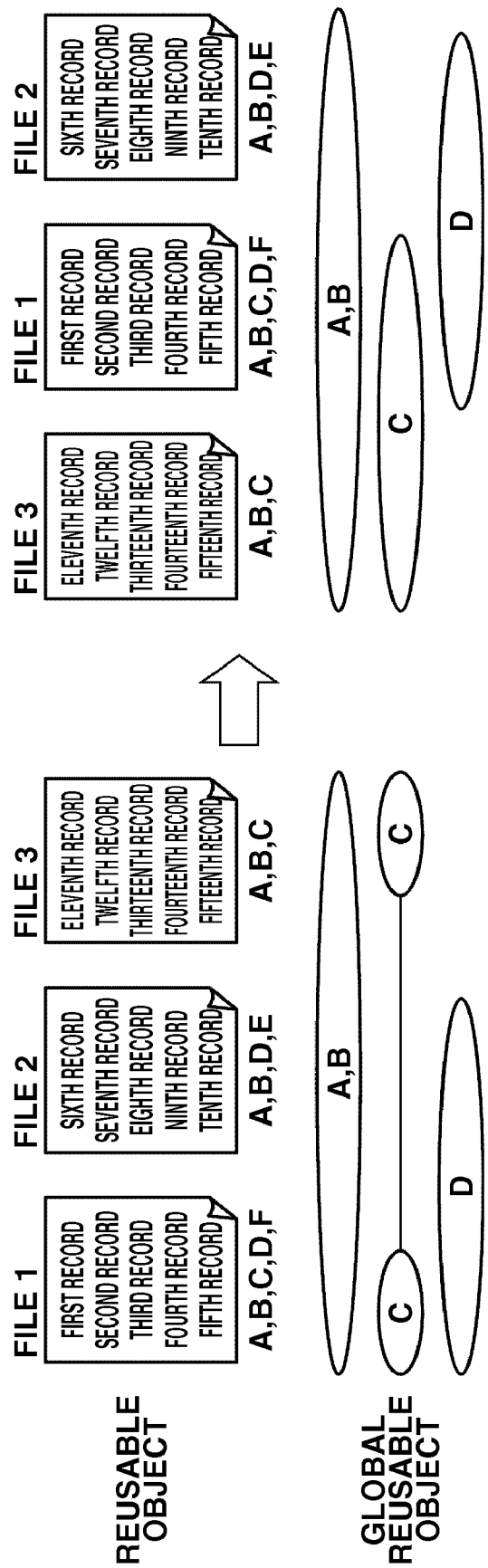

FIG.19
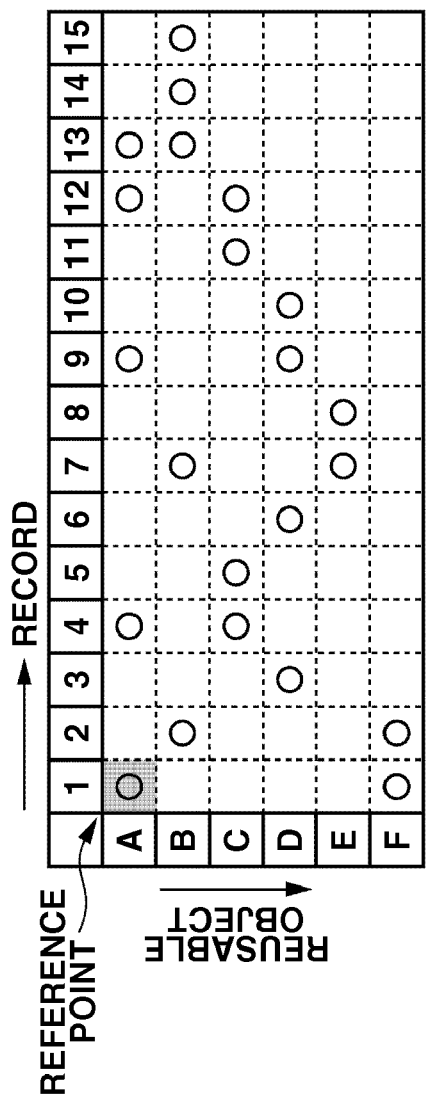
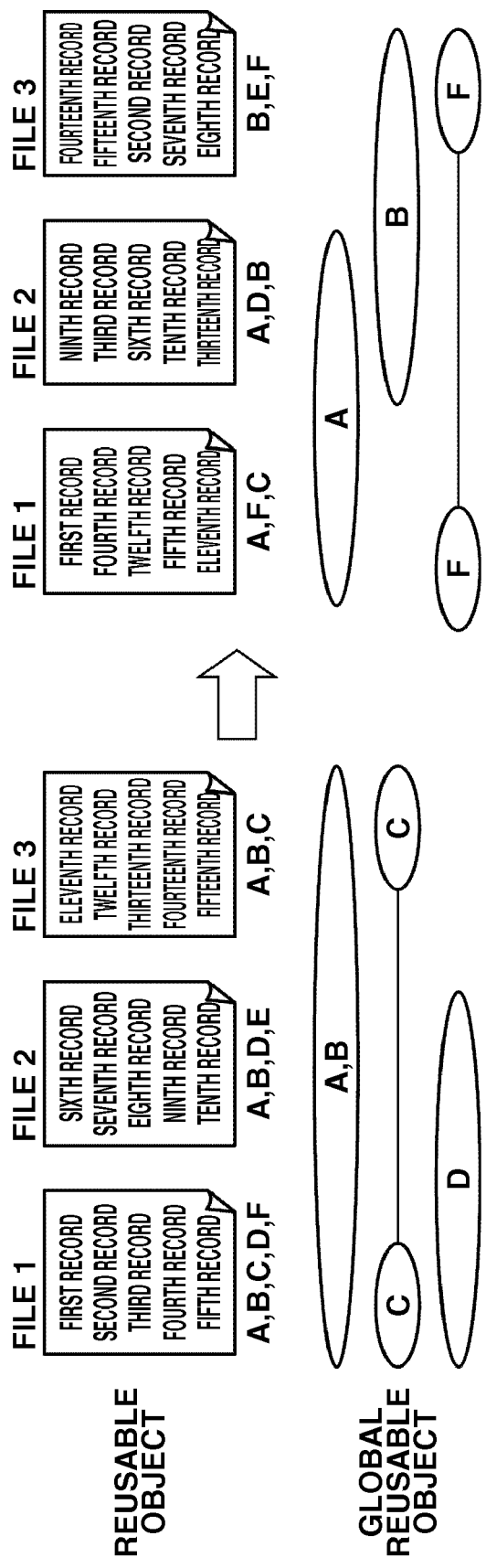

FIG.24

STORAGE MEDIUM (FD, CD-ROM, etc.)

| DIRECTORY INFORMATION |
|---|
| PROGRAM CODE CORRESPONDING TO STEPS IN FLOWCHART IN FIG. 13 |
| PROGRAM CODE CORRESPONDING TO STEPS IN FLOWCHART IN FIG. 17 |
| PROGRAM CODE CORRESPONDING TO STEPS IN FLOWCHART IN FIG. 18 |
| PROGRAM CODE CORRESPONDING TO STEPS IN FLOWCHART IN FIG. 20 |
| PROGRAM CODE CORRESPONDING TO STEPS IN FLOWCHART IN FIG. 21 |
| PROGRAM CODE CORRESPONDING TO STEPS IN FLOWCHART IN FIG. 23 |

IMAGE FORMING APPARATUS, METHOD, AND CONTROL PROGRAM FOR REARRANGING PRINT ORDER

BACKGROUND OF THE INVENTION

1. Field of the Invention

The present invention relates to an image forming apparatus that receives and processes a print job.

2. Description of the Related Art

Among the print methods that change print content from one printed piece to another for printing invoices and direct mails including personal data, use data, and data that vary according to each customer, there is Variable Data Printing (VDP). One technique that supports VDP is Personalized Print Markup Language (PPML). PPML is one type of printer language based on eXtensible Markup Language (XML) and is an open standard. Printing On Demand Initiative (PODi), which is an association for digital printing service, is responsible for the specifications for the PPML.

PPML allows easy description of instructions including operations such as defining a region, within a page, where an object is to be arranged, rendering an object in PostScript (PS), Portable Document Format (PDF), or Joint Photographic Experts Group (JPEG), and arranging the object in a predetermined position within the page.

In other words, while PS, PDF, and JPEG are used for rendering an object on a sheet, PPML is used for controlling a layout engine that arranges such an object on a sheet.

According to PPML, a name of a reusable object which is to be used again is defined. Once the name is defined, the object is referenced by the defined name from then on. This feature is called Reusable Object. The use of the reusable object eliminates the use of the rendering engine to repeatedly rasterize the same object if it is rasterized once.

Further, PPML allows the use of Global Reusable Object. According to the global reusable object, an object having a name defined according to a certain print job can be referenced from a different print job.

An image to be printed on a page is rendered based on template data that determines an arrangement region of the object and print object information kept in a database.

As described above, according to VDP, a user can change the object to be printed for each page. The user can further designate subsequent stage processing for each page. Setting a plurality of subsequent stage processing operations that can be set in one document is called subset finishing.

However, regarding the subset finishing that allows designation of a plurality of subsequent stage processing operations within a document, all the setting requested from the operator cannot be set unless the storage area is limitless. Thus, the maximum number of operations is set for the number of subset finishing operations that can be set.

For example, there may be many thousands of customers to print invoices or brochures. If, for example, the maximum number of times of subset finishing operations of an image forming apparatus used for printing such invoices or brochures is set to 400, the image forming apparatus may not be able to store all the subset finishing setting wanted by the operator.

Thus, conventionally, one print job sent to the image forming apparatus is divided into a plurality of files according to the maximum number of the subset finishing operations. Since the maximum number of the subset finishing operations of each file is determined, the memory area used when the printing is performed will be within the memory area for the subset finishing setting of the image forming apparatus.

However, even if the maximum number of the subset finishing operations is determined, a reusable object that is repeatedly used in one job still is to be defined for each of the files when it is used again.

For example, an object A defined as a reusable object in a first file may be used again in a second file.

In this case, the object A, which is rasterized when the first file is printed, is to be redefined and RIPped again when a second file is printed.

Since the reusable object cannot be used in a different file, the reusable object is deleted from the first file and generated again (RIPped) in the second file. Accordingly, additional regeneration processing is to be performed.

Thus, according to the conventional technique, due to the regeneration processing of the same object, printing performance has been low.

Under such circumstances, according to the conventional technique, as discussed in Japanese Patent Application Laid-Open No. 2007-226465, when one job is divided into a plurality of files, the job is divided according to use frequency of the reusable object used in each page.

Further, the printing performance is improved by transferring the files to a plurality of image forming apparatuses.

SUMMARY OF THE INVENTION

According to an aspect of the present invention, an apparatus includes a division unit configured to divide a print job into a plurality of data pieces, a definition unit configured to define an object used for each of the divided data pieces as a reusable object which can be used by each of the data pieces, a storage unit configured to store a lifetime of the defined reusable object, and a deletion unit configured to delete the stored reusable object after printing based on the print job is completed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 15 illustrates print order rearrangement processing of files by the image forming apparatus according to an exemplary embodiment of the present invention.

FIG. 19 illustrates rearrangement processing of a print job of the image forming apparatus according to an exemplary embodiment of the present invention.

FIG. 24 illustrates a memory map of a storage medium which stores various data processing programs which can be read by the image forming apparatus according to an exemplary embodiment of the present invention.

DESCRIPTION OF THE EMBODIMENTS

Various exemplary embodiments, features, and aspects of the invention will be described in detail below with reference to the drawings.

A configuration of a laser beam printer will be described as an example of an image forming apparatus applicable of a first exemplary embodiment of the present invention.

The present embodiment is applicable not only to a laser beam printer but also to an apparatus for processing images that can be visualized, such as an ink jet printer, an image setter, and an offset image forming apparatus. Hereinafter, an image forming apparatus represented by a laser beam printer is called a multifunction peripheral (MFP). The MFP internally includes a memory capable of storing data of a plurality of jobs. Such memory is, for example, a hard disk. Job data output from a scanner can be printed by a printer portion by use of the memory according to a copy function. Further, the MFP includes a plurality of functions including a print function that allows a print unit to perform printing of job data output from an external apparatus, such as a computer, by using the memory.

There are two types of MFP, a full-color MFP and a monochrome MFP. Basically, with the exception of the configurations for color processing and internal data processing, the full-color MFP includes most of the configurations of the monochrome MFP. Thus, the full-color MFP is mainly described in the present embodiment and the description of the monochrome MFP is added as needed.

Further, although the image forming system described above includes a multifunction image forming apparatus having a plurality of functions, the image forming system can additionally include a single function peripheral (SFP) which is an image forming apparatus dedicated for printing. Further, the image forming system can include either the MFP or the SFP. Furthermore, the image forming system can include a plurality of image forming apparatuses regardless of the type of the apparatuses. The configuration of the image forming system is not limited to the type and number of the image forming apparatus so long as the image forming system can be controlled by the control method of the present embodiment.

Figure 1:
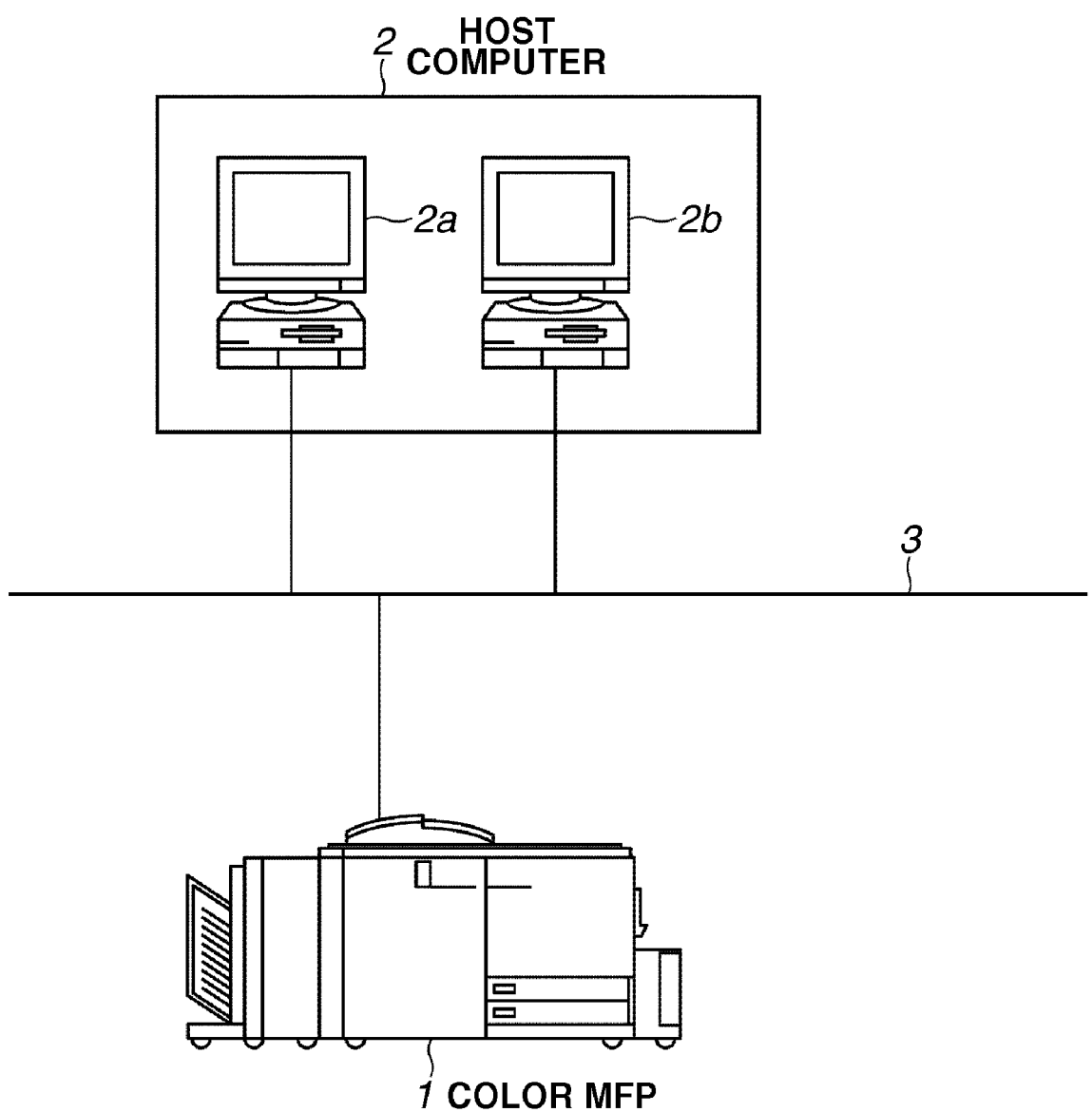
FIG. 1 illustrates an example of an image forming system including an image forming apparatus according to an exemplary embodiment of the present invention.

FIG. 1 illustrates an example of the image forming system including the image forming apparatus according to the present embodiment.

In FIG. 1, an MFP 1 is connected to host computers 2a and 2b via a network 3. The host computers 2a and 2b are hereinafter collectively called a host computer 2. The number of host computers is not limited and a great number of host computers can be included in the system. The network 3 is used for transmitting data from the host computer 2 to a color MFP (hereinafter referred to as an "MFP") 1 or exchanging commands between the host computer 2 and the MFP 1.

Functions of the MFP 1 will now be described.

The list below illustrates the functions of the MFP 1 and the flow of data when each of the functions is executed.

copy function: input image processing unit→output image processing unit→printer portion FAX transmission function: input image processing unit→FAX unit FAX receiving function: FAX unit→output image processing unit→printer portion network scan: input image processing unit→NIC unit network print: NIC unit→RIP unit→output image processing unit→printer portion scanning of image in external apparatus: input image processing unit→dedicated I/F unit print of image in external apparatus: dedicated I/F unit→output image processing unit→printer portion scanning of image in external memory: input image processing unit→USB I/F unit printing of image in external memory: USB I/F unit→RIP unit→output image processing unit→printer portion box scan function: input image processing unit→output image processing unit→document management unit box print function: document management unit→printer portion box receive function: NIC unit→RIP unit→output image processing unit→document management unit box send function: document management unit→NIC unit
preview function: document management unit→operation unit In addition to the above-described functions, various combinations are available by combining functions such as E-mail service and web server function. However, they are omitted for simplification.

Figure 2:
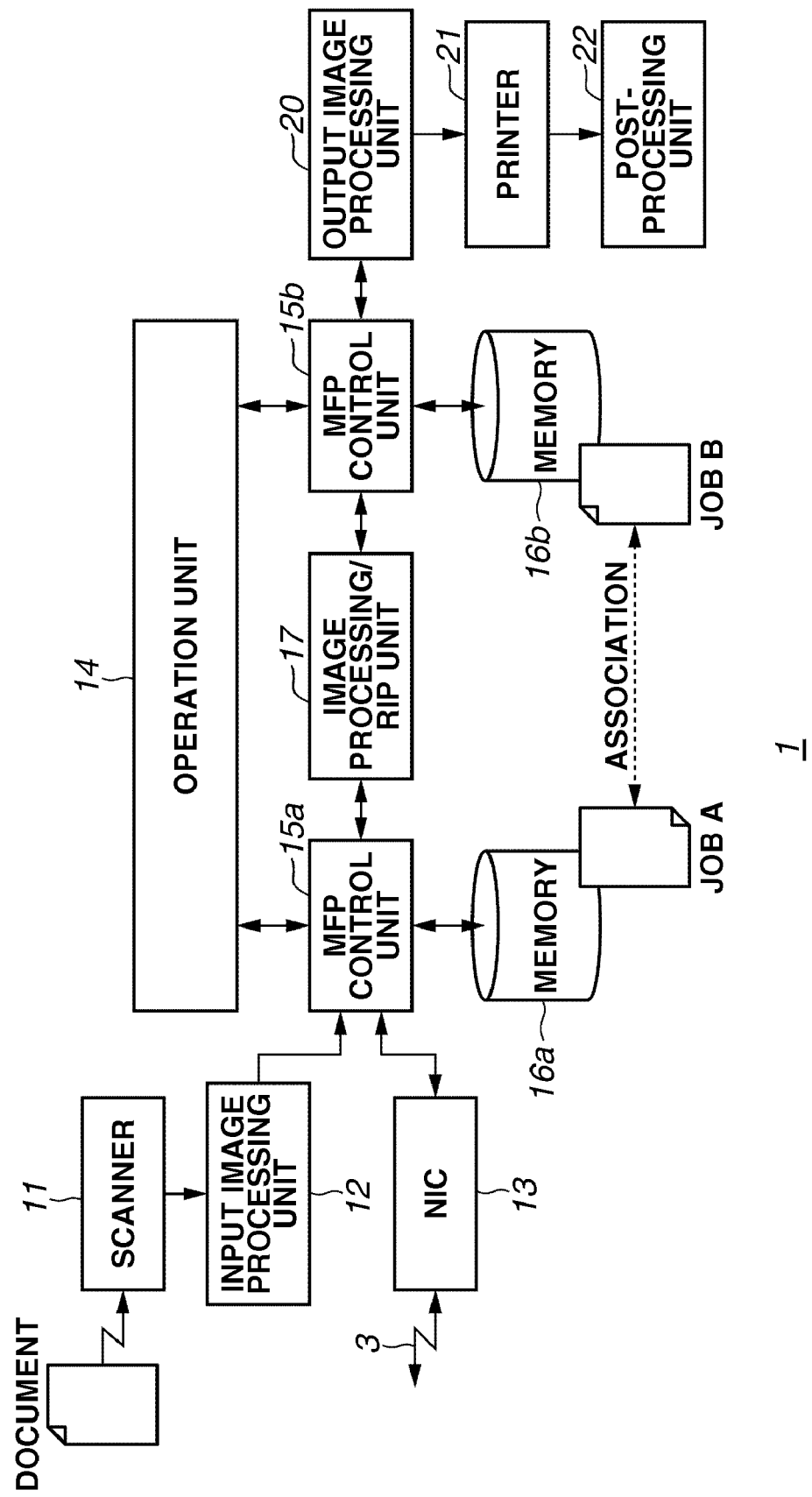
FIG. 2 is a block diagram illustrating a configuration of a multifunction peripheral (MFP) illustrated in FIG. 1.

FIG. 2 is a block diagram illustrating a configuration of the MFP 1 illustrated in FIG. 1.

In FIG. 2, an input image processing unit 12 performs image processing of image data (hereinafter referred to as "scanned image") which is obtained by a scanner 11 scanning a document image.

A network interface card (NIC) 13 transmits image data input via the network 3 to an image processing/RIP unit 17. Further, the NIC 13 transmits image data in the MFP 1 and apparatus information to an external apparatus via the network 3.

An MFP control unit 15a performs such control that an image input to the MFP 1 is stored as it is in a memory 16a. The input image is, for example, the scanned image or a network image.

The image processing/RIP unit 17 performs image processing of the image stored in the memory using software. Such processing which is, for example, correcting a skew of a scanned image or deleting an isolated point (noise removal) takes relatively long time. Further, the image processing/RIP unit 17 decodes the code of page description language (PDL) data input via the network 3 and generates raster data by executing raster image processing.

An MFP control unit 15b performs control such that the image data (raster data) output from the image processing/RIP unit 17 is stored in a memory 16b. A job A stored in the memory 16a and a job B stored in the memory 16b are associated with each other so that they can be invoked immediately.

Further, a user can invoke the job stored in the memory 16a or the memory 16b by operating an operation unit 14 or inputting an instruction via the network 3.

An output image processing unit 20 performs image processing of the image data sent from the MFP control unit 15b so that the image data can be printed.

A printer 21 supplies recording paper and sequentially prints the image of the image data output from the output image processing unit 20 on the supplied paper. A post-processing unit 22 performs sort processing or finishing processing (subsequent stage processing) of the printed recording paper. The subsequent stage processing can be changed for each sheet if designated by a print job.

The user operates the operation unit 14 when the user selects the above-described operations and functions. However, if a display device such as a liquid crystal display (LCD) included in the operation unit 14 is capable of producing high resolution image, the image stored in the memory 16a or 16b can be previewed and confirmed before it is printed.

The MFP control units 15a and 15b are illustrated in FIG. 2 as different components. This is because their functions are described separately in the description above.

However, since the MFP control units 15a and 15b are generally integrated, they are, in some cases, referred to as an MFP control unit 15 in the following description.

Similarly, the memory 16a and the memory 16b are illustrated in FIG. 2 as different components. This is because their functions are described separately in the description above.

However, since the memories 16a and 16b can be assigned to one hard disk as well as different hard disks, they are, in some cases, referred to as a memory 16 in the following description.

Figure 3:
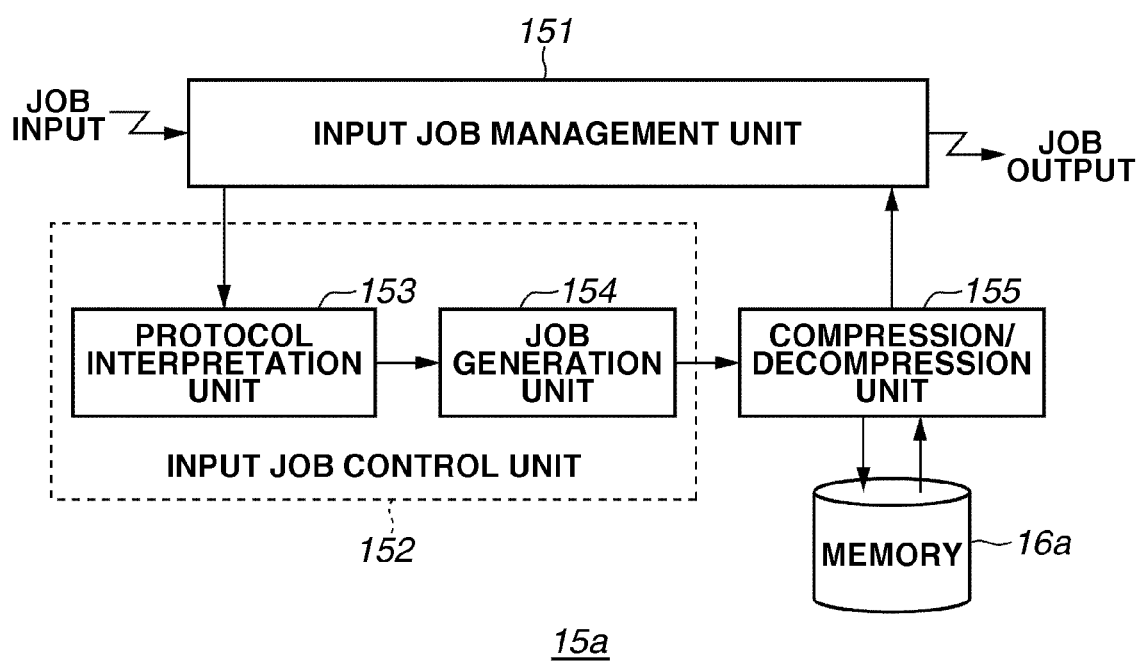
FIG. 3 is a block diagram illustrating a configuration example of an MFP control unit illustrated in FIG. 2.

FIG. 3 is a block diagram illustrating a configuration of the MFP control unit 15a illustrated in FIG. 2.

In FIG. 3, an input job management unit 151 manages input jobs and controls job reading from or job writing in the memory 16a and the order of job processing. Additionally, the input job management unit 151 controls a device when the device inputs a job.

An input job control unit 152 includes a protocol interpretation unit 153 and a job generation unit 154. A series of operation requests sent from the input job management unit 151 to the input job control unit 152 is received as an instruction signal called a command (protocol).

The protocol interpretation unit 153 interprets the outline of the operation request and converts it into an operation procedure understandable by the MFP 1.

The job generation unit 154 generates various jobs such as a print job, a scan job, a PDL rendering job, and a FAX reception job. The generated job contains a scenario (script) including content of processing performed by the MFP 1 and the destination of the processed job. Each job is processed in the MFP 1 according to the scenario.

A compression/decompression unit 155 compresses a job as needed and stores it in the memory 16a. When a compressed job is read out from the memory 16a, the compression/decompression unit 155 decompresses it. Job data read out from the memory 16a is output by the input job management unit 151.

Figure 4:
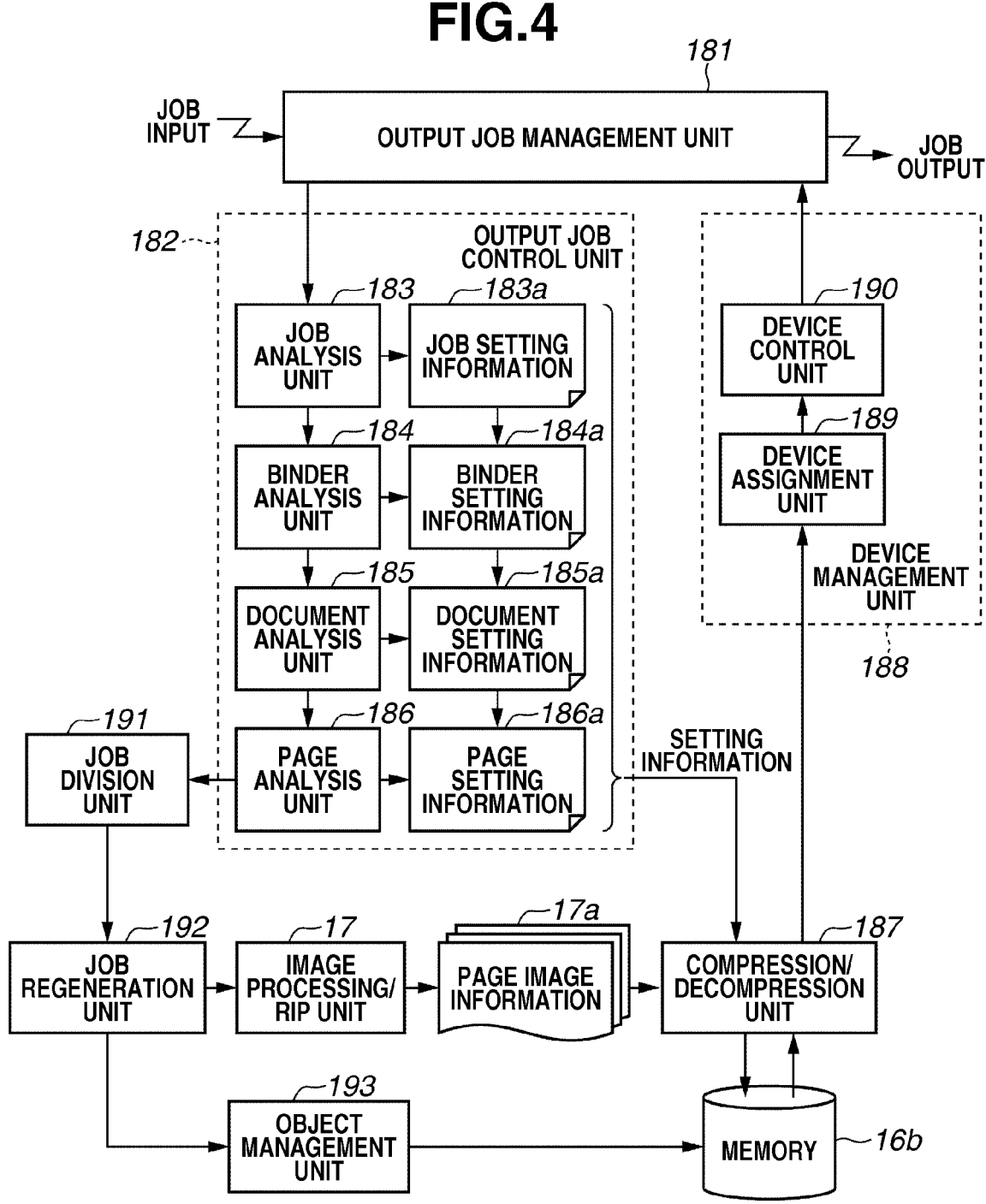
FIG. 4 is a block diagram illustrating a configuration example of another MFP control unit illustrated in FIG. 2.

FIG. 4 is a block diagram illustrating a configuration example of the MFP control unit 15b illustrated in FIG. 2.

In FIG. 4, an output job management unit 181 manages the job read out from the memories 16a and 16b. Further, the job management unit 181 controls writing of the job to the memory 16b and the processing order of the job.

An output job control unit 182 includes a job analysis unit 183, a binder analysis unit 184, a document analysis unit 185, and a page analysis unit 186. The output job control unit 182 generates job setting information (so-called job ticket) and image information.

The job analysis unit 183 analyzes details of the setting information concerning the job as a whole such as document name or number of prints to be printed, a discharge tray to which the printed document is output, and a binding order if the job includes a plurality of binders, and generates job setting information 183a.

The binder analysis unit 184 analyzes details of the setting information concerning the binder as a whole such as bookbinding setting, a stapling position, and a document order if the binder includes a plurality of documents, and generates binder information 184a.

The document analysis unit 185 analyzes details of the setting information concerning the document as a whole such as a page order of the document if the document includes a plurality of pages, designation of two-sided printing, whether additional cover or cardboard is used, and generates document setting information 185a.

The page analysis unit 186 analyzes details of the setting information concerning the page as a whole such as resolution, image orientation (landscape or portrait), and generates page setting information 186a.

A job division unit 191 performs division processing and divides a job into files if a number of print setting operations of the job entered (number of subset finishing operations) is larger than the maximum number of the operations in the MFP 1.

Although the processing performed by the output job management unit 181 is described as processing performed by the MFP 1 in the present embodiment, the processing can also be performed by the host computer 2. Further, by providing a print server that performs job management on the network 3 that connects the host computer 2 and the MFP 1, the job described above can be managed by the provided print server.

A job regeneration unit 192 redefines an object which can be used for each piece of data obtained by the division performed by the job division unit 191 as a global reusable object.

The job regeneration unit 192 generates a global reusable object life time table. The global reusable object life time table includes information of the files including the redefined global reusable objects (i.e., information of the start file and the last file including the global reusable object).

An object management unit 193 manages the life time table including information of the object life time and generated by the job regeneration unit 192. Further, after a file is printed, the object management unit 193 removes objects not used by the subsequent files from the memory 16*b* based on the above-described life time table.

Image information of a scanned image is generated by processing an image using image processing for a scanned image. Image information of PDL data is generated by invoking the image processing/RIP unit 17 and rendering the data. In this way, page image information 17*a* is generated. After the page image information 17*a* is compressed by a compression/decompression unit 187, it is associated with the scenario and the setting information, and then stored in the memory 16*b*.

A device management unit 188 includes a device assignment unit 189 and a device control unit 190. Page image information read out from the memory 16*b* together with the associated scenario and the setting information is decompressed by the compression/decompression unit 187. Then, the scenario, the setting information, and the page image information are input to the device management unit 188 as one set of information.

The device assignment unit 189 resolves device conflict that occurs in simultaneous processing of a plurality of jobs when a device is assigned based on the scenario. The device control unit 190 adjusts a schedule of the device to be used, for example, the printer 21 or the post-processing unit 22.

Three data storage schemes will now be defined.

The first storage scheme is a temporary storage scheme called "hold job". Stored data is deleted when a job is completed, memory usage of the memory 16 (memory or hard disk) exceeds a certain limit set in advance, or the power of the apparatus is turned off. In other words, this storage scheme is effective only during a limited period.

The second storage scheme is called "box job". According to the box job, the user can freely store data in the hard disk in the MFP, delete the stored data, and set a storage period or a security password.

The third scheme is called "archive job". According to the archive job, setting information (job ticket) and image information is stored together in a removable medium or a file server outside the MFP.

Figure 5:
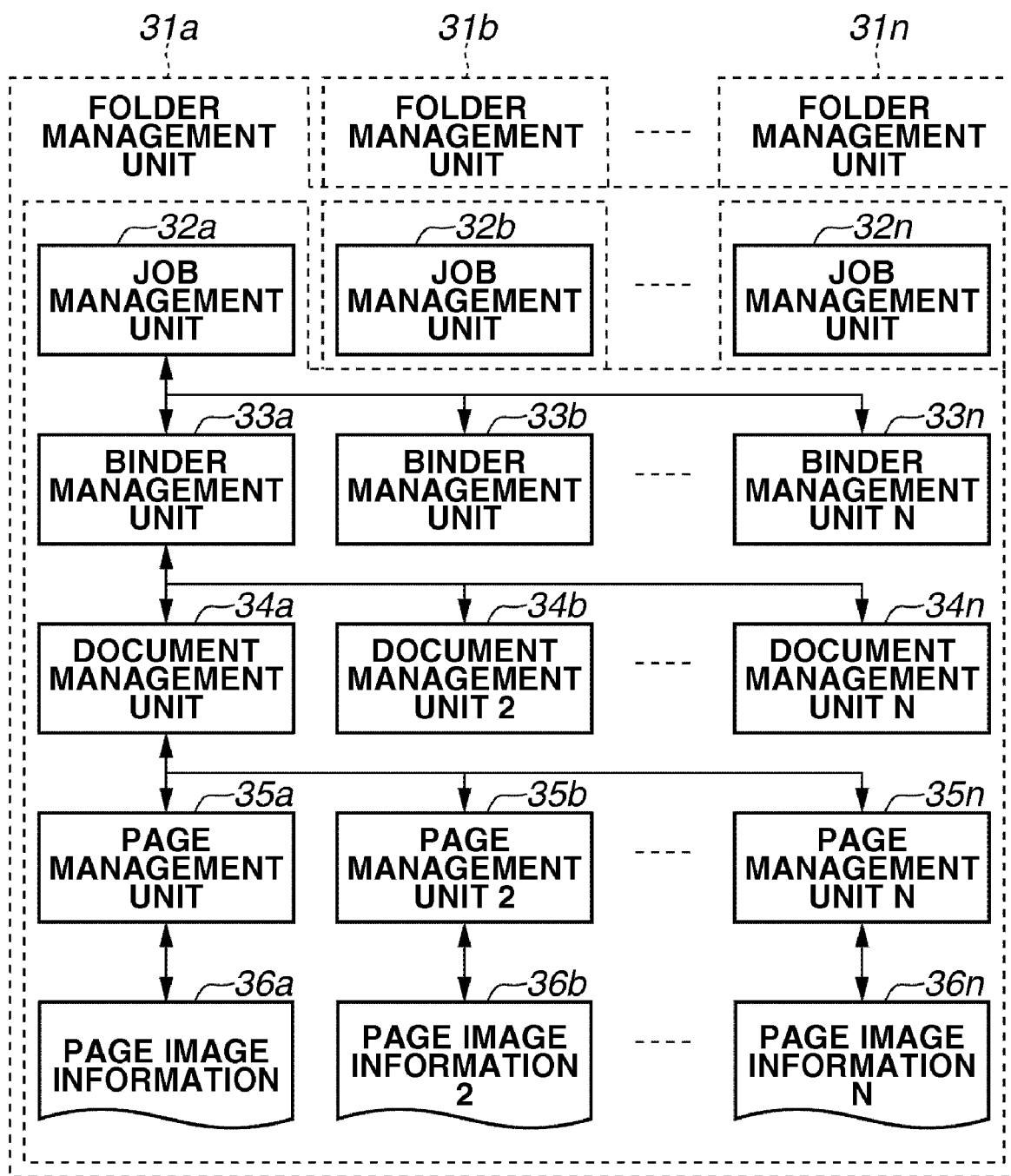
FIG. 5 is a conceptual diagram illustrating a management structure of a memory illustrated in FIG. 2.

FIG. 5 is a conceptual diagram illustrating a management structure of the memory 16 illustrated in FIG. 2. The methods described below can be generally applied to each of the above-described storage schemes.

In FIG. 5, the memory 16 includes one folder management units 31*a* or a plurality of folder management units 31*a* to 31*n* that store setting information concerning folder management. The one or a plurality of folder management units 31*a* to 31*n* include one job management units 32*a* or a plurality of job management units 32*a* to 32*n* that store job setting information.

The one or a plurality of job management units 32*a* to 32*n* include one binder management unit 33*a* or a plurality of binder management units 33*a* to 33*n* that store binder setting information. Further, the one or a plurality of binder management units 33*a* to 33*n* include one document management unit 34*a* or a plurality of document management units 34*a* to 34*n* that store document setting information.

The one or a plurality of document management units 34*a* to 34*n* include one page management unit 35*a* or a plurality of page management units 35*a* to 35*n* that store page setting information. The one or a plurality of page management units 35*a* to 35*n* store page image information 36*a* to 36*n* of each page.

The above-described job setting information, binder setting information, document setting information, and page setting information is setting information (job ticket) illustrated in FIG. 4. Information of various attribute values (parameters) used for the job processing is included in the setting information.

The page image information 36*a* to 36*n* stored in the page management unit 35*a* to 35*n* indicates image data of one page scanned by the scanner 11, image data of one page obtained by rasterizing PDL data sent from outside of the apparatus, or image data of one page sent from a fax machine. The page image information 36*a* to 36*n* can be either the image data compressed by the compression/decompression unit 155 or 187 or uncompressed image data.

Figure 6:
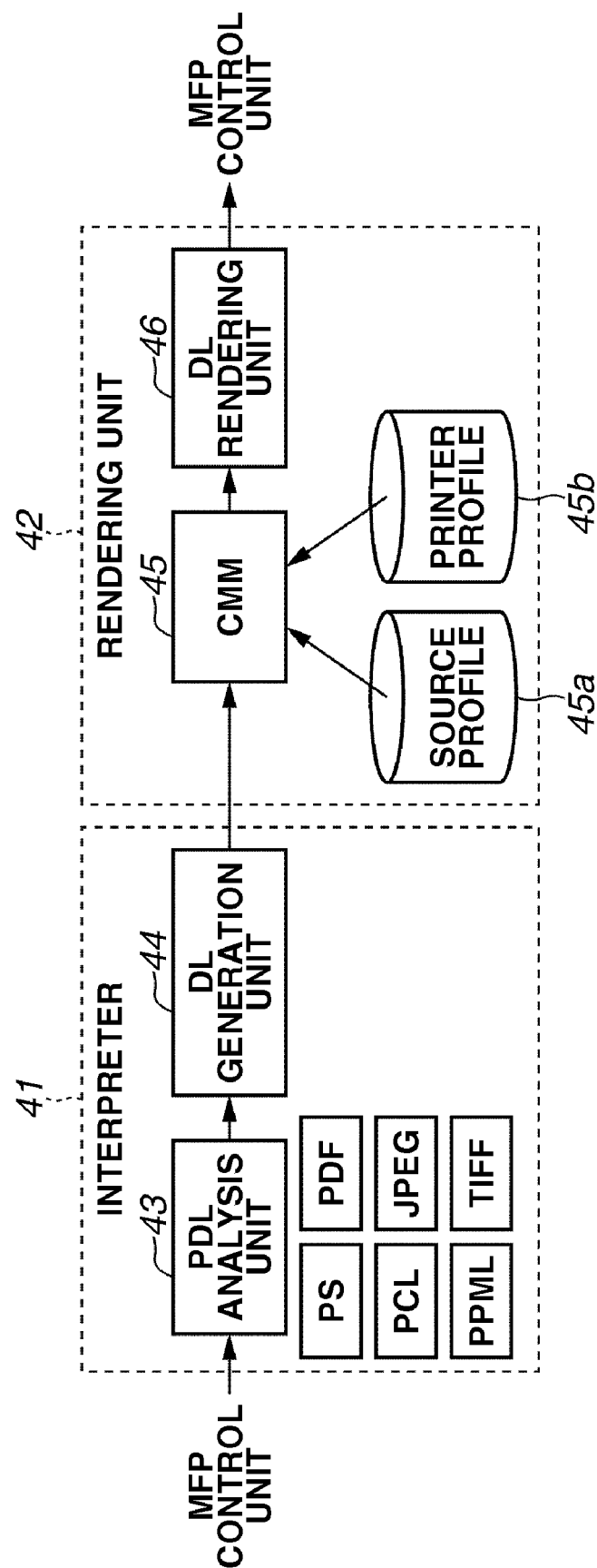
FIG. 6 is a block diagram illustrating an image processing/RIP unit illustrated in FIG. 2.

FIG. 6 is a block diagram illustrating the image processing/RIP unit 17 illustrated in FIG. 2. The RIP is processing used for rasterizing each object information as a raster image on the memory 16 so that vector information of characters, line arts, and graphics described by a description language such as PDL or bitmap information is reproduced simultaneously on a page.

Conventionally, the image processing/RIP unit 17 has been provided in the apparatus as a hardware component. Currently, however, due to the increased processing speed of central processing units (CPUs), it is often implemented in a form of software.

The image processing/RIP unit 17 generally includes an interpreter 41 and a rendering unit 42.

In FIG. 6, the interpreter 41 includes a PDL analysis unit 43 configured to analyze PDL data and a display list (DL) generation unit 44 configured to generate an intermediate file called a display list from the analyzed PDL data.

The PDL analysis unit 43 analyzes various kinds of PDL data that is input. Known PDL data formats are PostScript (R) developed by Adobe and Printer Control Language (PCL) developed by Hewlett Packard. The PDL data is described using printer control codes to generate an image in page units. The PDL data includes simple character codes as well as graphics rendering codes and photo image codes.

Further, a document file format developed by Adobe called PDF is widely used in various industries. Data in PDF that is directly input to the MFP 1 without being converted into PDL data (driver is not used) is also processed by the PDL analysis unit 43.

Other formats processed by the PDL analysis unit 43 are Variable Data Print (VDP) format such as Personalized Print Markup Language (PPML), and image compression formats such as Joint Photographic Experts Group (JPEG) and Tagged Image File Format (TIFF).

The rendering unit 42 includes a color matching module (CMM) 45 that performs color matching of a display list and a DL rendering unit 46 that renders the display list into bitmap data (raster image).

The CMM 45 receives various types of image data such as gray scale, RGB, and CMYK data. If the data is based on a different color space, if is temporarily converted into the CMYK space by CRD (Color Rendering Dictionary) and subjected to color matching. The CMM 45 adjusts the colors according to International Color Consortium (ICC) profile.

The ICC profile includes a source profile 45a and a printer profile 45b. The source profile 45a temporarily sets RGB (or CMYK) data into standardized CIELAB space and then converts the L*a*b* data into data based on the CMYK space that is appropriate for the target printer.

The source profile 45a includes an RGB profile and a CMYK profile. If the input image is an RGB image, the RGB profile is selected. If the input image is a CMYK system image, the CMYK profile is selected.

The printer profile 45b is generated according to the color characteristic of each printer. For an RGB image, "Perceptual" or "Saturation" is selected. For a CMYK image, "Colorimetric" is selected.

Generally, the ICC profile is in a look-up table format. If RGB data is input, the source profile 45a uniquely outputs L*a*b* data. Further, if L*a*b*data is input, the printer profile 45b uniquely outputs CMYK data that matches the printer 21.

RGB data that does not require color matching is converted into CMYK data according to default color conversion. CMYK data that does not require color matching is output as it is.

Figure 7:
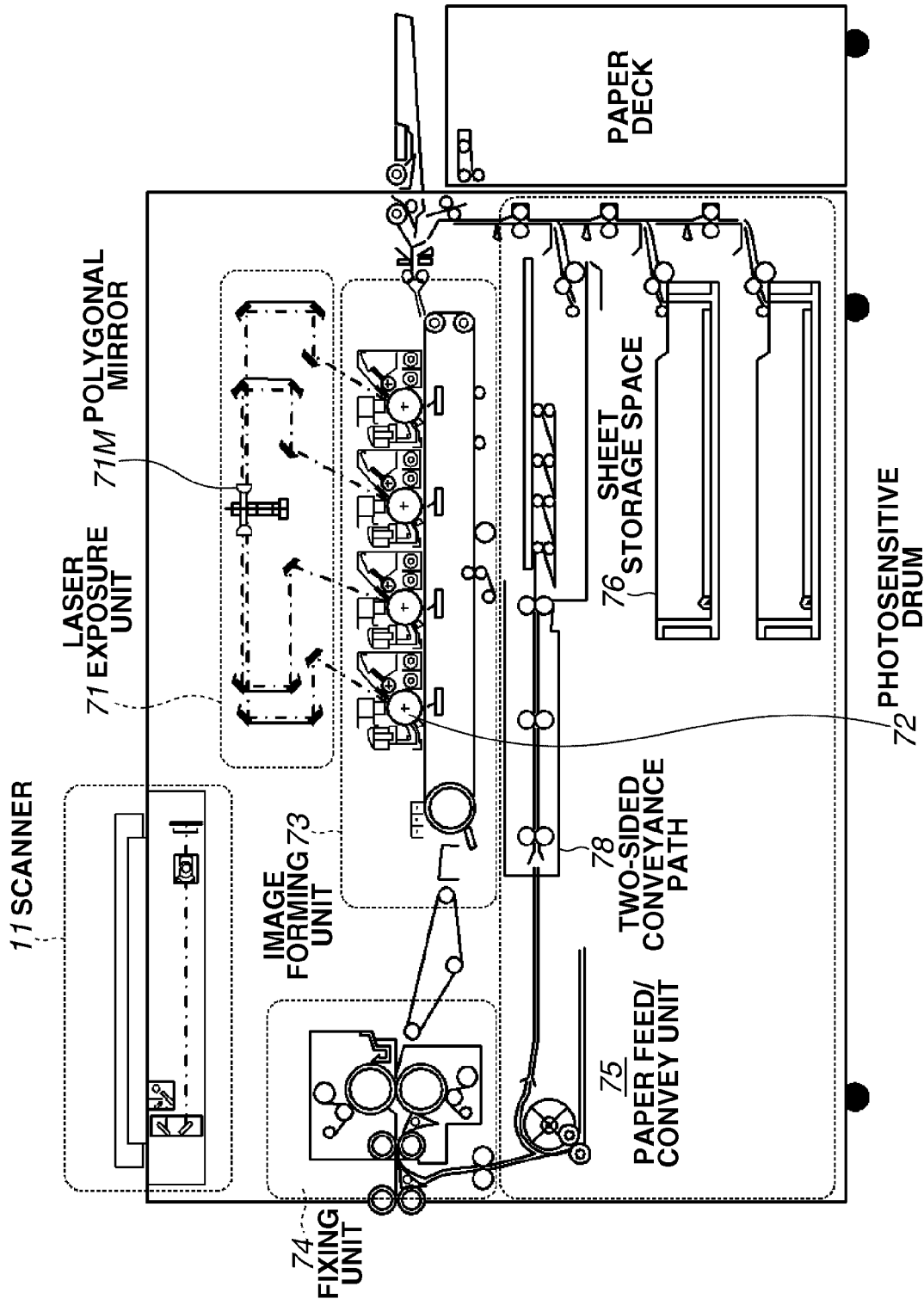
FIG. 7 is a cross section illustrating an engine configuration of the image forming apparatus according to an exemplary embodiment of the present invention.

FIG. 7 is a cross section illustrating an engine configuration of the image forming apparatus according to an exemplary embodiment of the present invention. The image forming apparatus in FIG. 7 is the printer 21 having a 4-drum (4D) color system configuration.

In FIG. 7, the 4D color printer 21 includes the scanner 11, a laser exposure unit 71, a photosensitive drum 72, an image forming unit 73, a fixing unit 74, a paper feed/convey unit 75, and a printer control unit (not shown) that controls the units.

The scanner 11 illuminates a document placed on a document positioning plate to optically scan the document image, converts the image into an electric signal, and forms image data.

The laser exposure unit 71 directs a light beam, such as a laser beam, which is modulated according to the image data, to a polygonal mirror which rotates at a constant angular speed. The light reflected from the polygonal mirror is emitted to the photosensitive drum 72 as scanning light.

The image forming unit 73 is configured to form an image by a series of electrophotographic processes including rotating the photosensitive drum 72, applying an electric charge to a charging unit, developing a latent image formed on the photosensitive drum 72 by the laser exposure unit 71 with toner, and transferring the toner image to a sheet.

The image forming unit 73 also recovers a minute amount of toner that remains untransferred on the photosensitive drum 72. Image formation is realized by four developing units (developing stations) of the above-described series of electrophotographic processes.

The four developing units are arranged in the order of cyan (C), magenta (M), yellow (Y), and black (K). Magenta, yellow, and black image forming operations are sequentially executed after a predetermined time from the start of the image formation of the cyan station. With this timing control, a full-color toner image without color misregistration is transferred onto a sheet.

The fixing unit 74 includes a combination of rollers and belts and a heat source such as a halogen heater. The fixing unit 74 applies heat and pressure to fix the toner which is transferred to the sheet.

The paper feed/convey unit 75 includes at least one sheet storage space 76 represented by a sheet cassette or a paper deck. According to an instruction from the printer control unit, one sheet out of a plurality of sheets stored in the sheet storage space 76 is separated and conveyed to the image forming unit 73 and the fixing unit 74.

A toner image of each color is transferred to the conveyed sheet by the above-described developing units so that a full-color toner image is finally formed on the sheet.

Further, for forming images on both sides of the sheet, the sheet which passed through the fixing unit 74 is controlled to be conveyed to the image forming unit 73 again through a two-sided conveyance path 78.

The printer control unit communicates with the MFP control unit 15 which controls the entire MFP 1. Based on an instruction from the MFP control unit 15, the printer control unit controls each state of the scanner 11, the laser exposure unit 71, the image forming unit 73, the fixing unit 74, and the paper feed/convey unit 75 so that the entire printing process is operated smoothly.

The outline of the operations of each unit from a power-off state of the apparatus to an operable state will now be described.

When the apparatus is powered on, the printer control unit instructs the scanner 11, the laser exposure unit 71, the image forming unit 73, the fixing unit 74, and the paper feed/convey unit 75 to start the preparing operation and waits for the start of the communication with the MFP control unit 15 that manages the entire MFP.

When the communication with the MFP control unit 15 is established, the printer control unit and the MFP control unit exchange their specifications. After then, when the preparing operation of each unit controlled by the printer control unit is completed and the image forming operation becomes possible, the printer control unit notifies the MFP control unit that each unit is in an operable state.

Further, the printer control unit detects the various states of each unit and provides the MFP control unit 15 with such information. The information includes the size of sheet stored in the sheet storage space 76, the amount of paper stacked, and the operating state of a drive unit of the paper feed/convey unit 75 (e.g., whether the drive unit is operable or failed). Further, the printer control unit provides information of a toner level of a toner container.

The outline of the operations of each unit including the start of the operable state, the instruction of operation from the MFP control unit 15, the execution of print operations will now be described.

The MFP control unit 15 sends an operation start command to the printer control unit. Upon receiving the operation start command, the printer control unit instructs the laser exposure unit 71, the image forming unit 73, the paper feed/convey unit 75, and the fixing unit 74 to start the print operation.

According to the instructions given by the printer control unit, the laser exposure unit 71 drives a motor (polygonal mirror drive motor) that moves a polygonal mirror 71M, and the image forming unit 73 starts charging the photosensitive drum by rotating the drum. The fixing unit 74 turns on the fixing heater and raises the temperature to a toner-fixing temperature. Further, the paper feed/convey unit 75 drives the drive motor so that it is in a sheet-conveyable state.

When the units are ready, the printer control unit notifies the MFP control unit 15 that the preparation operations are completed. Upon receiving the notification, the MFP control unit 15 instructs the printer control unit to perform print operation in page units.

If the print job is a job for printing 20 sets of 10-page prints, the MFP control unit 15 instructs the printer control unit to print 200 pages. Upon receiving the print operation instruction, the printer control unit instructs the paper feed/convey unit 75 to start feeding paper.

If a sheet is available, the paper feed/convey unit 75 feeds and conveys one sheet. When the sheet reaches a predetermined position, the paper feed/convey unit 75 notifies the printer control unit that the sheet has reached the position.

If a sheet is not available in the sheet storage space 76, the paper feed/convey unit 75 notifies the printer control unit that the paper feeding is not possible. The paper feed/convey unit 75 can also include a double feed sensor used for detecting two sheets of paper fed at once on the path (double feed state) or a thickness sensor used for detecting sheet thickness.

When the double feed sensor or the thickness sensor detects a double feed state or an error, the paper feed/convey unit 75 stops the paper feed/convey operation and notifies the printer control unit of the error. Upon receiving the error notification, the printer control unit notifies the MFP control unit 15 of the reason for stopping the operation as well as the position of the sheet in the apparatus.

If the printer control unit is notified by the paper feed/convey unit 75 that the sheet is conveyed normally to the predetermined position, the printer control unit instructs the image forming unit 73 to start the image forming operation according to that timing. According to this timing control, a toner image is transferred onto the sheet. Although the fixing unit 74 monitors and controls the fixing temperature, if the amount of heat absorbed by the sheet is too large, the fixing temperature may be decreased.

In such a case, the fixing unit 74 notifies the printer control unit that the fixing temperature is decreased. Upon receiving the notification, the printer control unit performs control so that the conveyance interval of the sheets is extended and further decrease in the fixing temperature will not occur. If the temperature of the fixing unit does not recover even if the above measure is taken, the printer control unit temporarily stops the operation. After the fixing temperature returns to the appropriate temperature, the printer control unit starts the operation again.

When all the sheets are discharged, the printer control unit instructs each unit to stop the operation. Upon receiving a notification from each unit that the operation has been stopped, the printer control unit notifies the MFP control unit 15 that the operation has been completed.

Figure 8:
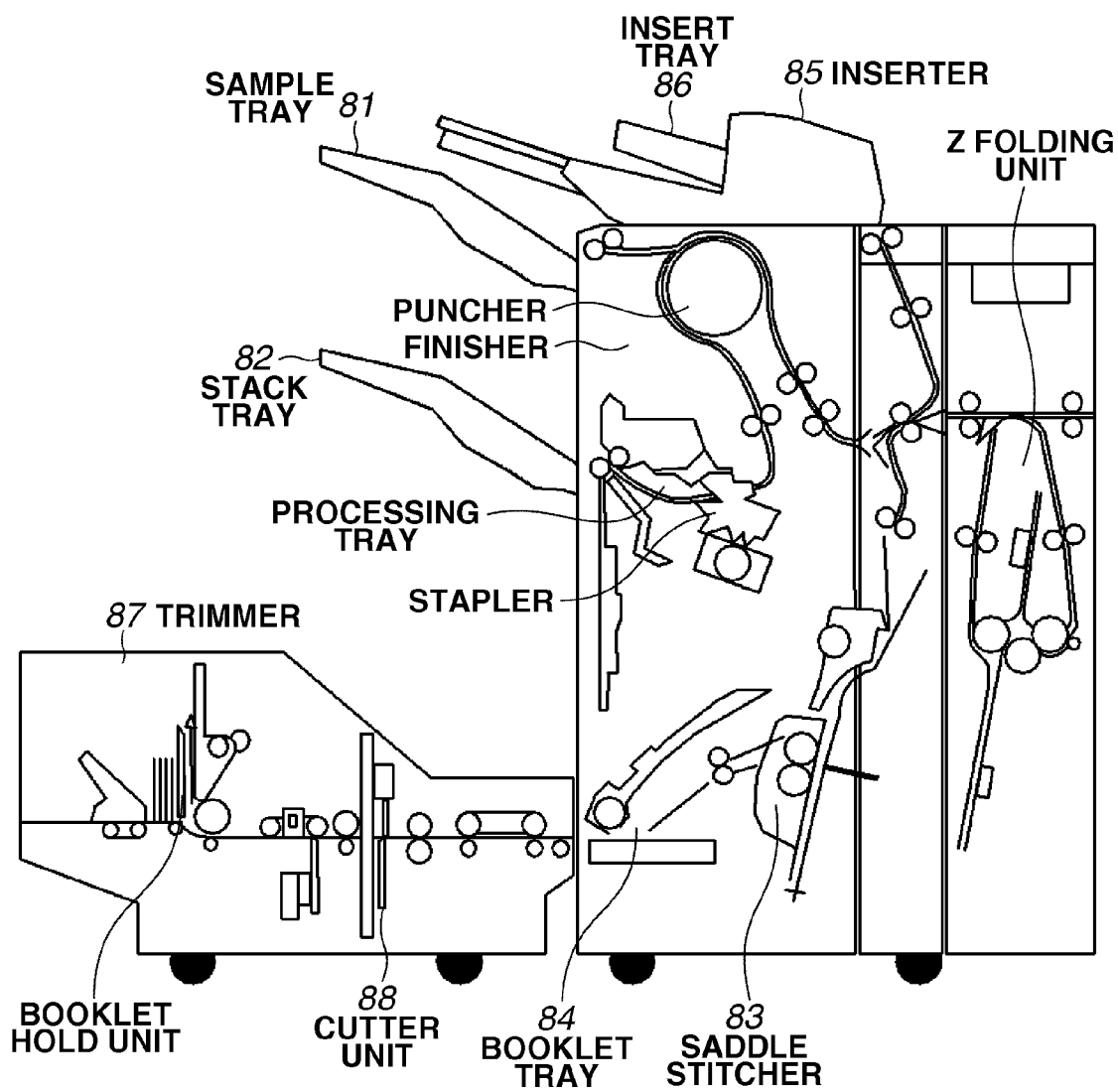
FIG. 8 is a configuration example illustrating a post-processing unit (in-line finisher) illustrated in FIG. 2.

FIG. 8 is a configuration example illustrating the post-processing unit (in-line finisher) 22 illustrated in FIG. 2.

In FIG. 8, the sheet discharged from the fixing unit 74 of the printer 21 is conveyed to the in-line finisher 22 if the finisher is connected. The sheet is discharged to a sample tray 81 or a stack tray 82, which is switched according to a type of the job or the number of sheets to be discharged.

There are two types of sort methods. According to a bin sort method, a plurality of bins are prepared and sheets are sorted into the respective bins. According to a shift sort method, an electronic sort function and a bin (or, a tray) are shifted in depth directions to sort out the discharged sheets for each job.

The electronic sort function is referred to as collation. If the memory 16 of the MFP control unit 15 is a large capacity memory, by using this large capacity memory and a so-called collation function used for changing the buffered page order and the discharge order, the electronic sort function can be realized.

In addition to the sort function, there is a function called group function. Unlike the sort function that sorts the sheets for each job, the group function sorts the sheets for each page.

Furthermore, if a staple mode is set for jobs to be discharged, before the sheets are discharged to the stack tray 82, they are sequentially accumulated in a processing tray inside the finisher for each job. Subsequently, the sheets are bound by a stapler in the processing tray. Then, the sheet batch is discharged to the stack tray 82.

Additionally, before the sheets are discharged to the above-described two trays, a Z-folding unit that folds the sheet into Z-fold and a puncher that punches two (or three) holes for a file are provided. The Z-fold processing and the punch processing is performed according to the type of the job.

For example, if the Z-fold processing is set by the user operating the operation unit 14, each sheet of the job will be Z-folded by the Z-folding unit. Then, the Z-folded sheet is discharged to the discharge tray such as the stack tray 82 or the sample tray 81 after it is conveyed inside the in-line finisher 22.

Further, if the punch processing is set for a job, each sheet of the job will be punched by the puncher. Then, the punched sheet is discharged to the discharge tray after it is conveyed inside the in-line finisher 22.

Furthermore, a saddle stitcher 83 is provided to perform processing (bookbinding processing) for producing a booklet such as a brochure. The sheets are bound by the saddle stitcher at two positions and conveyed to rollers to be center fold. Then the sheets processed by the saddle stitcher 83 are discharged to a booklet tray 84. Whether the sheet processing such as the bookbinding processing performed by the saddle stitcher 83 is executable depends on, as described above, the sheet processing setting set by the user for the job to be output.

An inserter 85 is used for conveying a sheet set on an insert tray 86 directly to one of the discharge trays such as the stack tray 82 or the sample tray 81 without the sheets passing through the printer 21. With this structure, the sheet set in the inserter 85 can be inserted between the sheets that are to be sent to the in-line finisher 22 (sheets printed by the printer 21). The sheets on the insert tray 86 are set in a face-up manner. According to the operation of the pick up roller, the sheets are subsequently fed from the top sheet of the stack. When the sheets set in the inserter 85 are conveyed to the stack tray 82 or the sample tray 81, they are discharged in a face-down manner.

If the sheets are conveyed to the saddle stitcher 83, the sheets are temporarily guided to the side of the puncher and then guided back to the saddle stitcher 83. In this way, the faces of the sheets are adjusted. Whether the insert processing performed by the inserter 85 is executable is, as described above, based on the sheet processing setting set by the user for the job to be output.

When the booklet (saddle-stitched booklet) formed by the saddle stitcher 83 is conveyed to a trimmer (paper cutting unit) 87, rollers feed the booklet for a predetermined length, and a cutter unit 88 cuts the end of the booklet by a predetermined length.

Thus, even if the booklet has an uneven end, the rough edges are trimmed and removed. Then, the booklet is stored in a booklet hold unit. Whether the cutting processing performed by the trimmer 87 is executable is, as described above, based on the sheet processing setting set by the user for the job to be output.

Next, PPML will be described as a technique that allows designation of an object and post-processing for each page.

As described above, by using PPML, operations such as defining a region, within a page, where an object is to be arranged, rendering an object in PS or PDF, and arranging the object in a predetermined position on the page, becomes possible.

Thus, printing of different page for each customer can be performed according to PPML. Accordingly, invoices and direct mails aimed at individuals can be printed.

An example of printing using a PPML job will now be described referring to FIG. 9.

Figure 9:
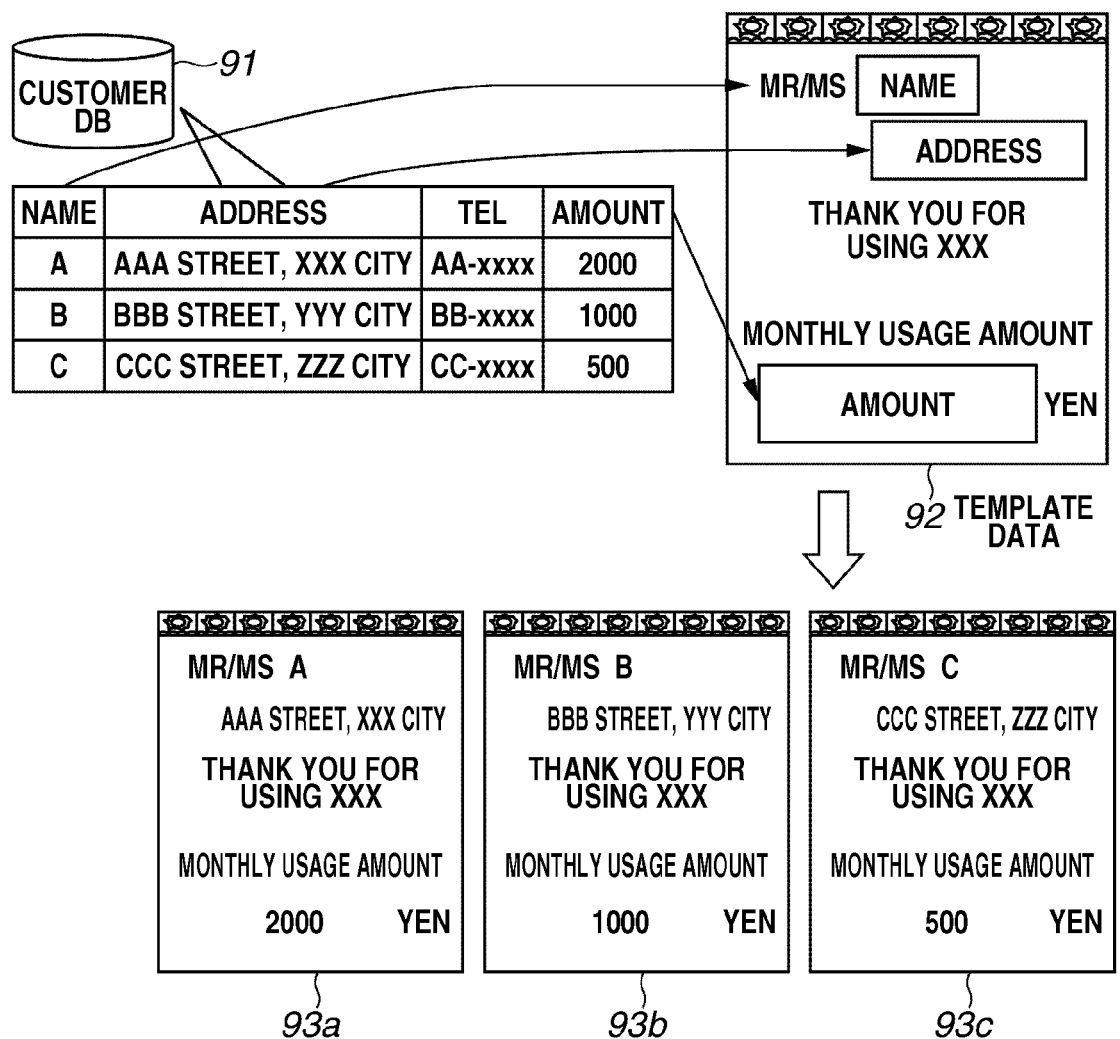
FIG. 9 illustrates an example of variable print processing by the image forming apparatus according to an exemplary embodiment of the present invention.

FIG. 9 illustrates an example of variable print processing by the image forming apparatus according to the present embodiment. The example illustrated in FIG. 9 is a case where an invoice is printed using customer data.

As the invoice in FIG. 9 illustrates, printing of different page data is performed for each customer based on customer information or monthly usage contained in a customer database (DB) 91. Before the page data is printed, the data of each customer contained in the customer DB 91 is inserted in template data 92 that defines the arrangement region of the object.

For example, by arranging customer A, customer B, and customer C, whose names are set in the name fields of the customer DB 91, in the predetermined name regions of the template data 92, different page data can be generated for each customer.

Although telephone number fields are contained in the customer DB 91, since they are not set in the template data 92, telephone numbers are not included in the page data that is to be printed. Page data in the DB and generated by the record unit is shown as page data 93a, 93b, and 93c in the lower portion of FIG. 9.

The template data 92 includes a stationary region and a variable region. The variable region includes data that varies according to each customer in the customer DB 91. According to the example illustrated in FIG. 9, the name, the address, and the sum fields are the variable regions. Designated object in the customer DB 91 is inserted in the variable region.

The stationary region is used for designating an object that does not change depending on the background or the record. Since a stationary object is used a plurality number of times by different records, it is defined as a reusable object.

According to the conventional technique, in performing such printing that uses different setting for each customer, a maximum number of subset finishing (subsequent stage processing) operations is set for the MFP 1. Thus, a job is divided into files so that the number of the subset finishing operations is smaller than its maximum number.

Figure 10:
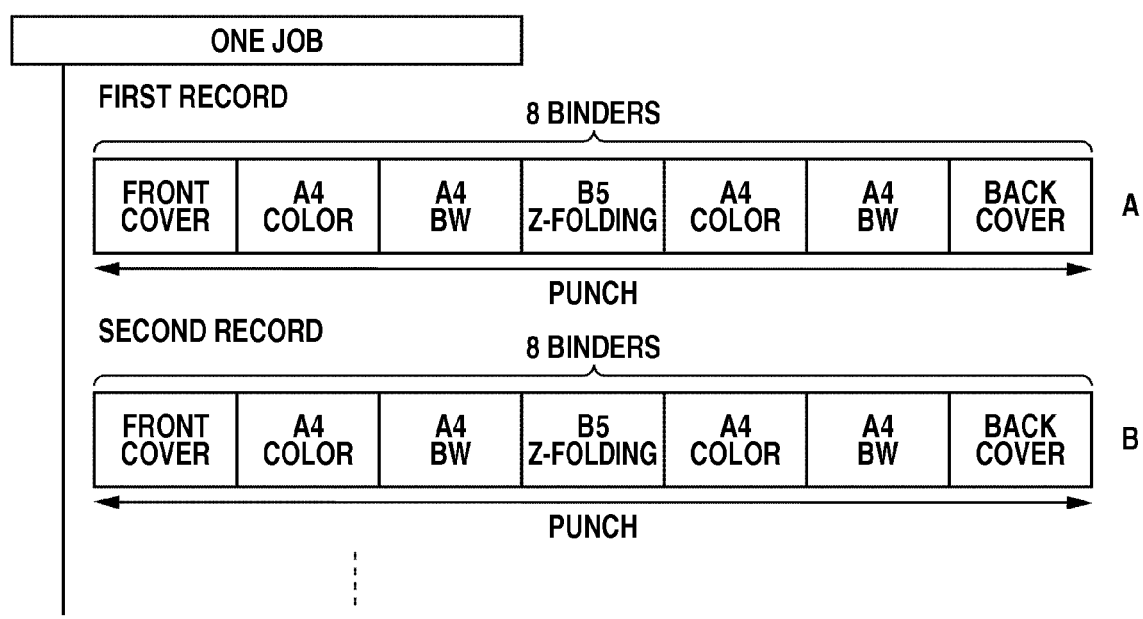
FIG. 10 illustrates a setting example of subset finishing set for a job processed by the image forming apparatus according to an exemplary embodiment of the present invention.

FIG. 10 will now be used to describe the issue solved by the present invention. According to the example illustrated in FIG. 10, eight binders are set for one record. More specifically, a total of eight binders (number of setting operations) which are a front cover page, an A4 color page, an A4 black-and-white (BW) page, an A5 Z-folded page, an A4 color page, an A4 BW page, a back cover page, and punching of all the pages are set for one record In other words, FIG. 10 illustrates the number of subset finishing operations set in one record. Invoice printing of person A, which is the first record of the print job, includes a total of eight subset finishing operations. Invoice printing of person B and subsequent people also includes eight subset finishing operations.

Thus, if the maximum number of the subset finishing operations of the MFP 1 is "400", conventionally, the job has been divided into files each including 50 records.

Figure 11:
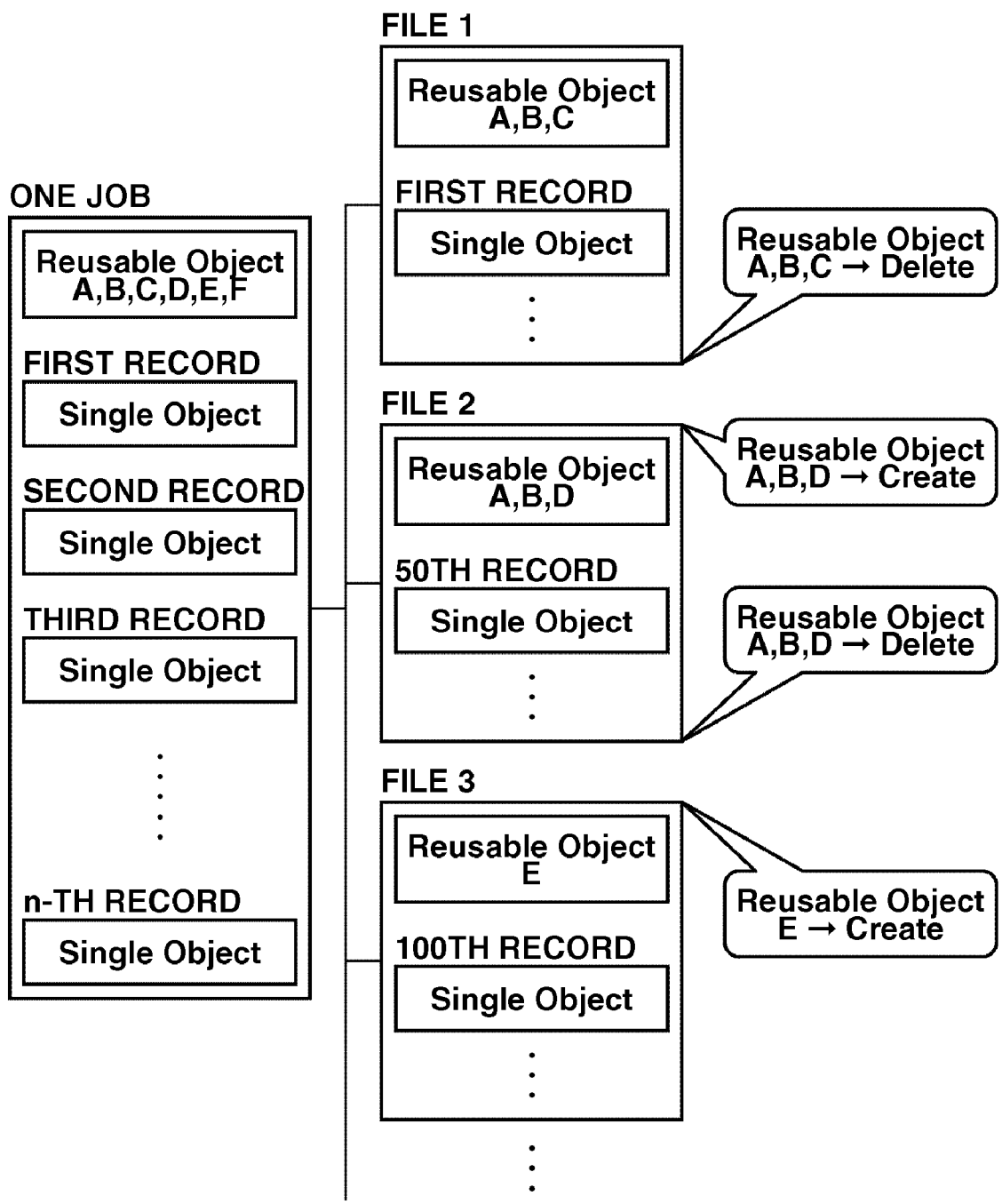
FIG. 11 illustrates an object used in common among files by the image forming apparatus after the division of the job according to an exemplary embodiment of the present invention.

However, as illustrated in FIG. 11, it is not possible to keep an object in two files when a received print job is divided into a plurality of files. Thus, if an object once generated is to be used in a different file, the object is to be deleted and generated again.

For example, in FIG. 11, objects A and B are used in file 2 as well as file 1 after the job division. However, when the printing of the file 1 is completed, the objects A and B stored in the storage unit are deleted.

Thus, the data of the objects A and B is not available at the time the file 2 is printed. Accordingly, rasterization of the objects A and B is to be performed again. This means that deletion and regeneration of an object, which are unnecessary under normal conditions, are added to the processing. As a result, performance is reduced.

For this reason, the image forming apparatus according to the present embodiment has the following characteristic configuration so as to prevent reduced performance due to the deletion and the regeneration processing of the object when the division processing is performed.

Figure 12:
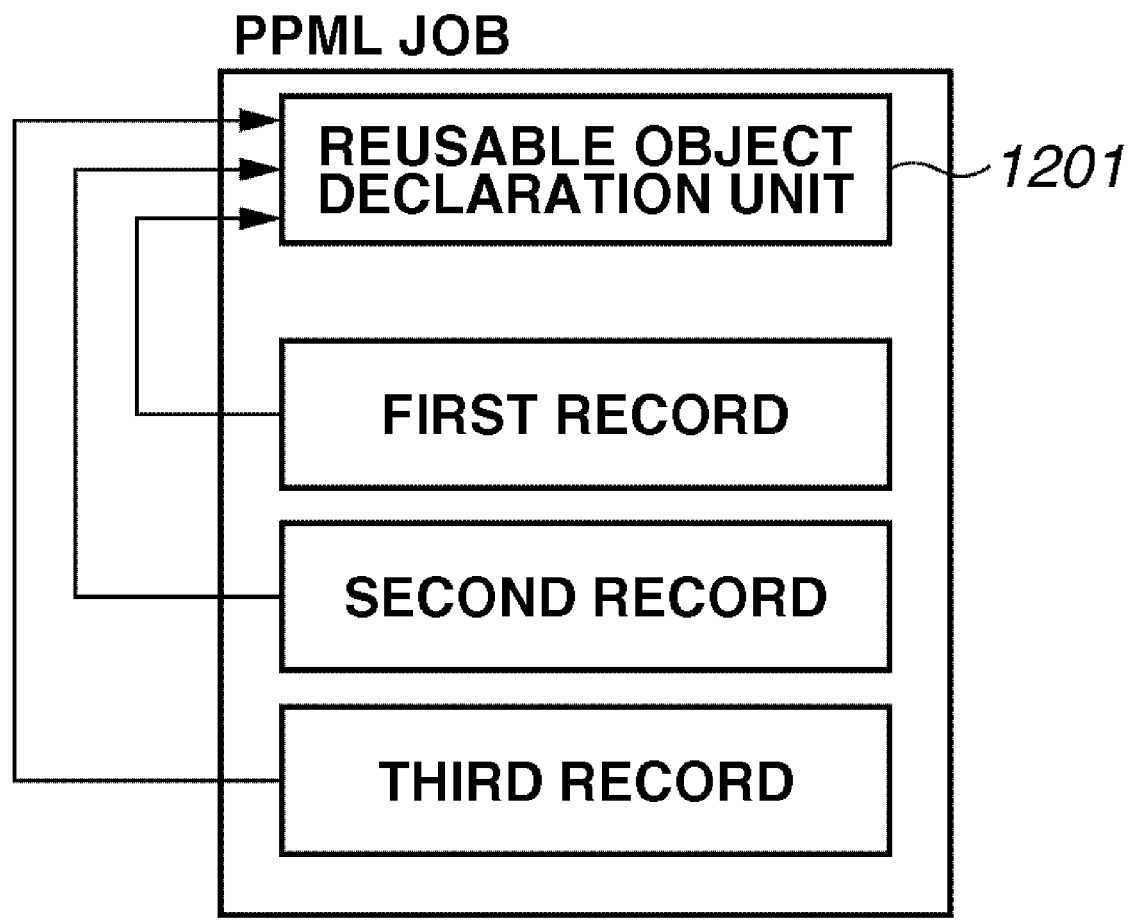
FIG. 12 illustrates a structure of the job processed by the image forming apparatus according to an exemplary embodiment of the present invention.

FIG. 12 illustrates a structure of a job processed by the image forming apparatus according to the present embodiment. According to the present embodiment, an example of a PPML job structure will be described.

According to the PPML job, first, the name of an object used for a plurality of times is defined. Then, a declaration of a reusable object is made so that the name-defined object can be referenced by the defined name.

By using the reusable object, the name of the object to be referenced, the file format, the width and height of a region where the object will be rendered, and the scope of the definition of the reusable object can be designated.

According to the definition of the reusable object performed by a declaration unit 1201, each of the subsequent records can reference the reusable object.

If each record of a PPML job uses a reusable object as described above, definition of the reference is performed. Further, an object that is used only in one record and not in other records will also be defined.

Next, processing of the MFP of a PPML job will be described referring to FIGS. 13 and 14.

Figure 13:
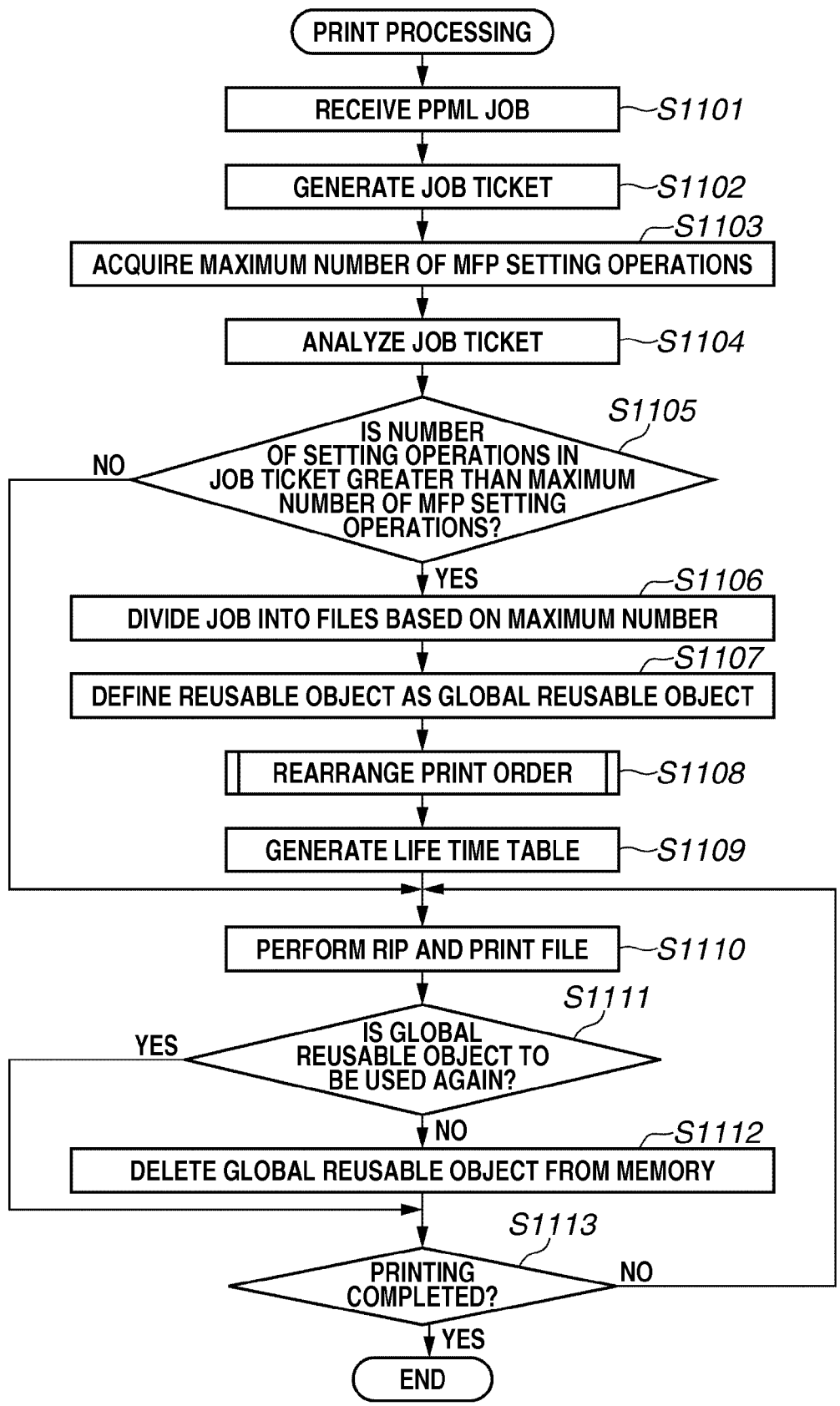
FIG. 13 is a flowchart illustrating an example of a job processing procedure by the image forming apparatus according to an exemplary embodiment of the present invention.

FIG. 13 is a flowchart illustrating an example of a job processing procedure by the image forming apparatus according to the present embodiment. The flowchart is an example of processing performed when a PPML job is submitted. When a PPML job is submitted by a driver running on the host computer 2 or a submission tool, each step in the flowchart is executed by the MFP control unit 15. The MFP control unit 15 includes hardware resources such as a CPU, a read-only memory (ROM), and a random access memory (RAM) as well as software resources.

Figure 14:
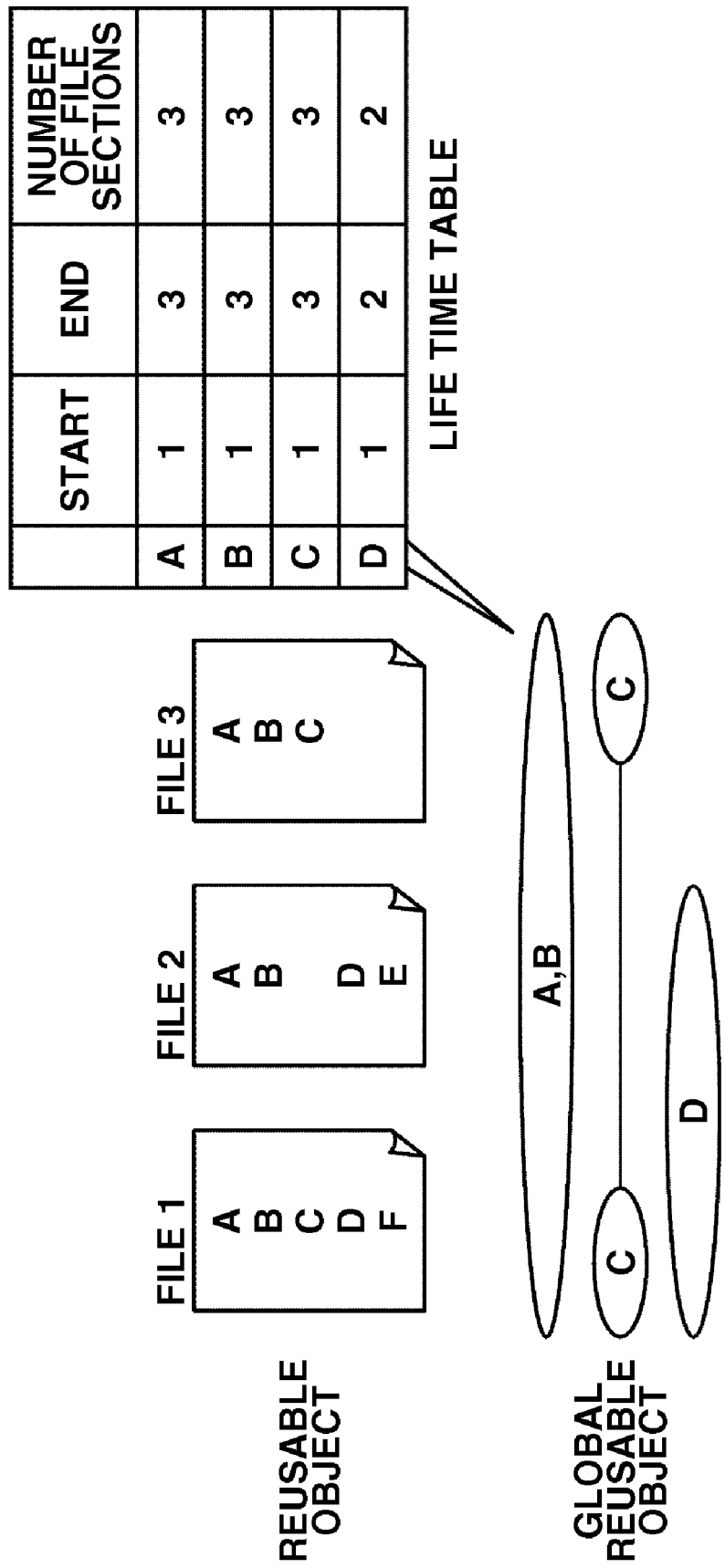
FIG. 14 illustrates an example of a global reusable object life time table generated by a job regeneration unit illustrated in FIG. 4.

FIG. 14 illustrates an example of a global reusable object life time table generated by the job regeneration unit 192 illustrated in FIG. 4. Job processing of the present embodiment will now be described in detail referring to FIG. 14.

Regarding the global reusable object life time table illustrated in FIG. 14, global reusable objects A and B are used in files 1 to 3, a global reusable object D is used in files 1 and 2, and global reusable object C is used in files 1 and 3. Further, the global reusable object life time table includes information of a first file, a last file, and a number of file sections in which the global reusable object is used in a file.

In step S1101, the input job management unit 151 illustrated in FIG. 3 receives a PPML job from the host computer 2. In step S1102, the job generation unit 154 generates a job ticket using the received PPML job and stores the generated job ticket in the memory 16a.

In step S1103, the output job management unit 181 acquires the maximum number of the subset finishing operations set in the MFP 1. In step S1104, the output job control unit 182 extracts the total number of the setting operations described in the job ticket. Before the extraction, the job analysis unit 183, the binder analysis unit 184, the document analysis unit 185, and the page analysis unit 186 analyze the generated job ticket. According to the example illustrated in FIG. 10, the total number of the setting operations is the total number of the subset finishing operations described in the job ticket and eight subset finishing operations are set for each record.

In step S1105, the job division unit 191 determines whether the total number of the setting operations described in the job ticket is greater than the maximum number of the subset finishing operations that can be set for the MFP 1. If the job division unit 191 determines that the total number of the setting operations is greater than the maximum number of the subset finishing operations (YES in step S1105), the process proceeds to step S1106. In step S1106, the job division unit 191 divides the job into files.

On the other hand, if the job division unit 191 determines that the total number of the setting operations is not greater than the maximum number of the subset finishing operations (NO in step S1105), then the process proceeds to step S1110.

In step S1110, since the division processing of the job into files is not necessary, the image processing/RIP unit 17 converts the object included in the job into printable raster data (performs RIP). Then, the converted raster data is stored in the memory 16b together with image information of the corresponding page. After then, according to the print timing scheduled by the device management unit 188, the data is output from the printer 21.

In step S1105, if the job division unit 191 determines that the total number of the setting operations is greater than the maximum number of the subset finishing operations (YES in step S1105), the process proceeds to step S1106. In step S1106, the job division unit 191 determines the number of records of each file, after the job division, that is not greater than the maximum number of the subset finishing operations of the MFP 1. Subsequently, the job division unit 191 divides one job into a plurality of files according to the determined number of records.

For example, if "10" is set as the maximum number of the subset finishing operations of the MFP 1, and the number of the subsequent stage processing operation is three for the first record, two for the second record, and three for the third and the fourth records, then the job division unit 191 performs the division processing such that the first to the third records are included in one file. In this way, according to the number of subsequent stage processing operations obtained by analyzing the job ticket, a print job is divided into a plurality of files.

In step S1107, the job regeneration unit 192 defines a reusable object used in common among the files as a global reusable object. In step S1108, the print order of each file is rearranged according to the use order of the global reusable object. Details of the rearrangement processing in step S1108 will be described in detail below.

In step S1109, the job regeneration unit 192 generates the global reusable object life time table, which includes information of the files that include the global reusable object (i.e., the first file and the last file that include the global reusable object). Further, the object management unit 193 manages the life time table that includes information of the object life time and generated by the job regeneration unit 192. The table is stored in the memory 16.

In step S1110, each file generated by the job regeneration unit 192 is converted (RIPped) by the image processing/RIP unit 17 into printable raster data and subsequently stored in the memory 16b together with image information of the corresponding page. Timing of printing of the raster data stored in the memory 16b is scheduled by the device management unit 188. The data is output to the printer 21 to be printed.

In step S1111, the object management unit 193 refers to the global reusable object life time table illustrated in FIG. 14 and determines whether the global reusable object used in a file is to be used again in the subsequent file. If the object management unit 193 determines that the global reusable object is not to be used again in the subsequent file (NO in step S1111), the process proceeds to step S1112.

In step S1112, the object management unit 193 deletes the global reusable object which is not to be used again from the memory 16b.

On the other hand, in step S1111, if the object management unit 193 determines that the global reusable object is to be used again in the subsequent file (YES in step S1111), the process proceeds to step S1113. Accordingly, the global reusable object is not deleted from the memory 16b and used again when the subsequent file is printed.

According to the deletion processing of the global reusable object, the raster data of the global reusable object stored in the memory 16b is deleted. When the MFP control unit 15b receives information that the printing of the divided files output from the output job management unit 181 has been completed, the MFP control unit 15b notifies the object management unit 193 that the printing has been completed.

Since the object management unit 193 manages a life time table such as the one illustrated in FIG. 14, it is possible to determine whether the object included in the printing-completed file is to be used in the subsequent file.

According to the example illustrated in FIG. 14, if printing of the second file is completed, the global reusable object D will no longer be used in the third file. Thus, the global reusable object D can be deleted at the time the printing of the second file is completed.

Further, the object management unit 193 deletes the raster data of the object to be deleted from the memory 16b. The deletion according to the present embodiment means to free the allocated region having the size of the raster data of the object of the memory 16b.

In step S1113, the MFP control unit 15 determines whether the printing of the files is completed. If the MFP control unit 15 determines that the printing is completed (YES in step S1113), then the process ends. If the MFP control unit 15 determines that the printing is not yet completed (NO in step S1113), then the process returns to step S1110 and the printing is repeated until all the files are printed.

Next, print order rearrangement processing of each file obtained in step S1108 according to the use order of the global reusable object will be described referring to FIGS. 15 to 17.

FIG. 15 illustrates the print order rearrangement processing of files of the image forming apparatus according to the present embodiment. In FIG. 15, a correspondence table of the reusable objects used in each record as well as the files including the reusable objects is illustrated. The maximum number of the subset finishing operations is set to 5 (5 records) and the print job is divided into files accordingly.

The state of the files on the left side of the arrow in FIG. 15 is a case where the job is divided into files without the implementation of the file order rearrangement processing.

The illustration in FIG. 15 is a case where the job is divided by the job division unit 191, and although a global reusable object C redefined by the job regeneration unit 192 is used only in files 1 and 3, it also remains in file 2. Thus, when the file 2 is printed, the unnecessary global reusable object C remains in the memory 16, and thus the memory 16 is not used effectively. For this reason, the MFP control unit 15*b* performs print order change processing to optimize the print order. Referring now to FIGS. 16 and 17, the file print order rearrangement processing of the present embodiment will be described.

Figure 16:
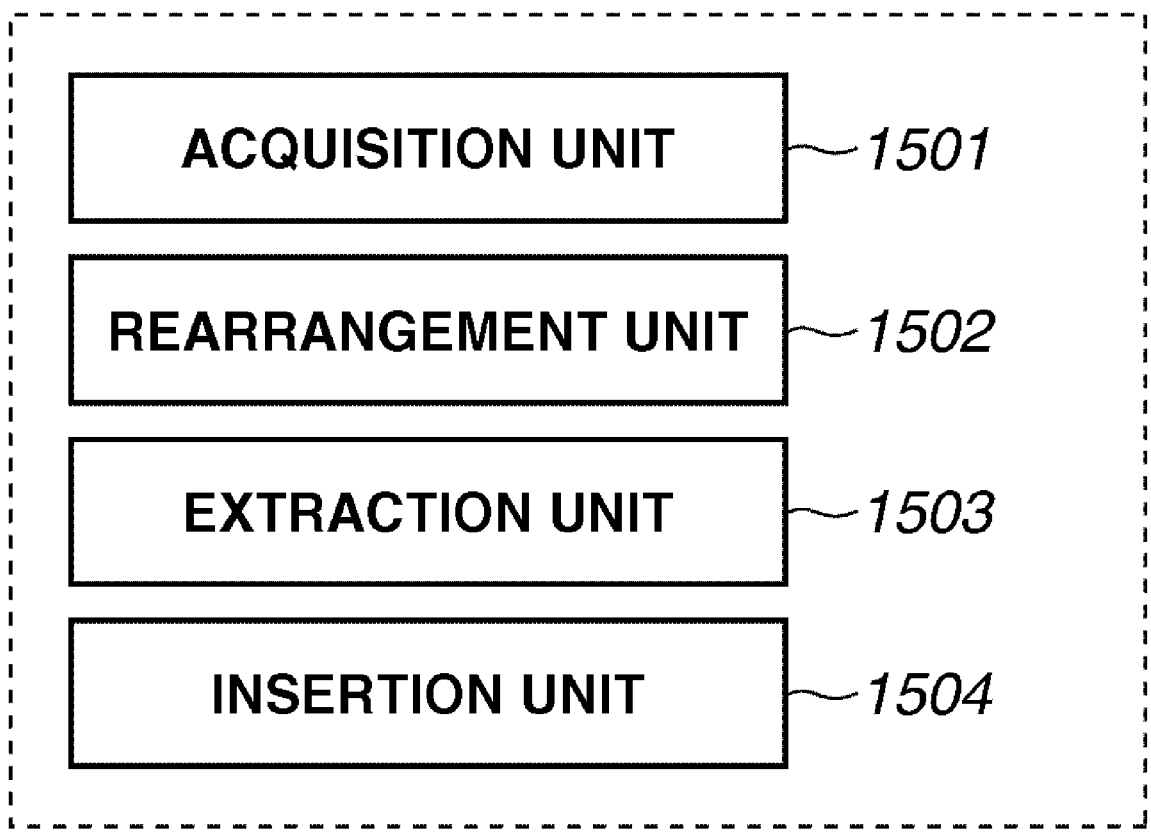
FIG. 16 is a block diagram illustrating a configuration of a job regeneration unit illustrated in FIG. 4.

FIG. 16 is a block diagram illustrating a configuration of the job regeneration unit 192 illustrated in FIG. 4.

In FIG. 16, the job regeneration unit 192 includes an acquisition unit 1501, a rearrangement unit 1502, an extraction unit 1503, and an insertion unit 1504. The acquisition unit 1501 acquires a number of times each record references the global reusable object managed by the object management unit 193.

The rearrangement unit 1502 rearranges the print order of the files. The extraction unit 1503 extracts an object to be included in the files after the job is divided into the files based on an extraction condition.

The insertion unit 1504 inserts the reusable object extracted by the extraction unit 1503 into the file after the division.

Figure 17:
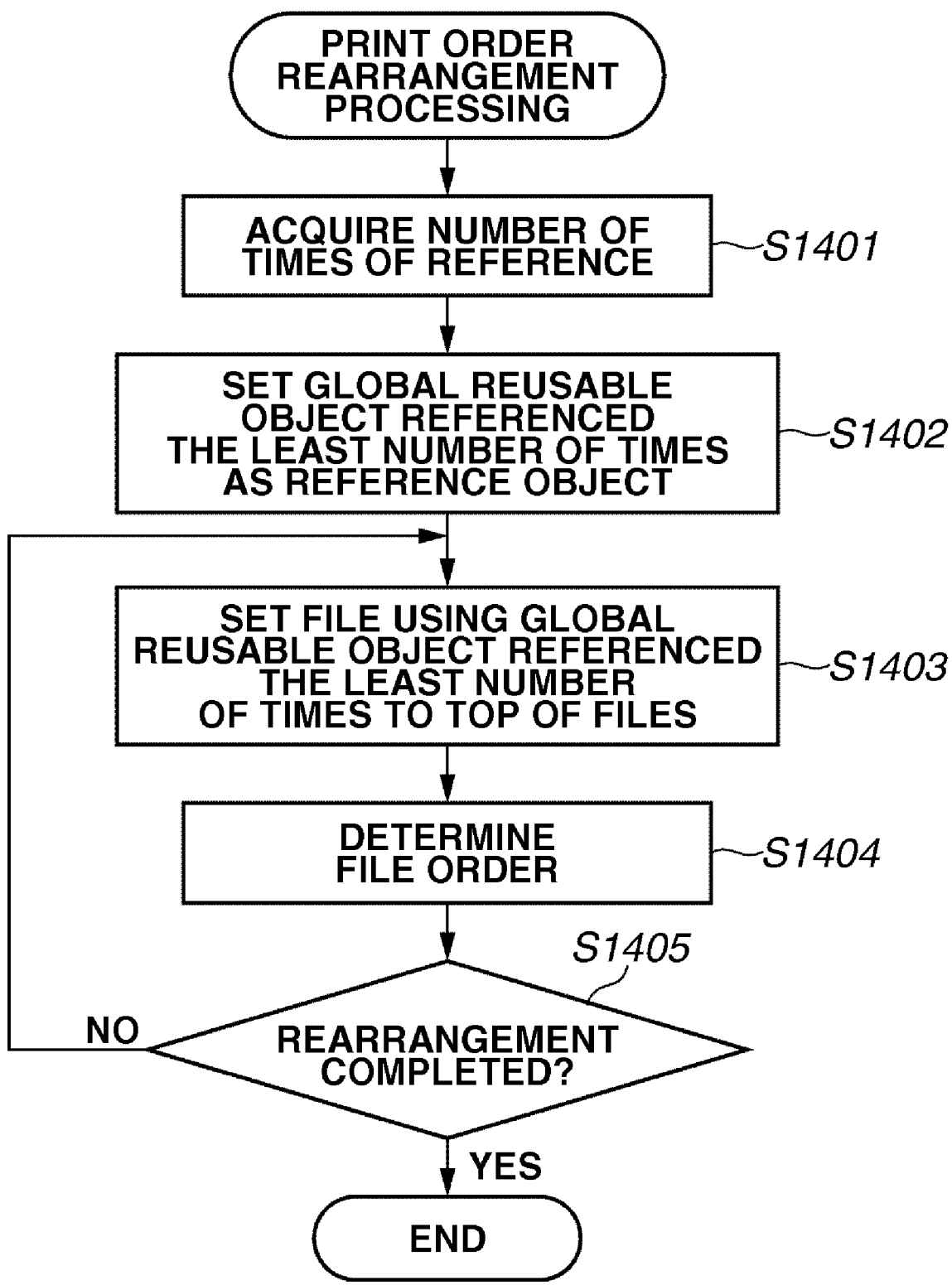
FIG. 17 is a flowchart illustrating an example of a job processing procedure by the image forming apparatus according to an exemplary embodiment of the present invention.

FIG. 17 is a flowchart illustrating an example of job processing procedure by the image forming apparatus according to the present embodiment. The flowchart describes detailed procedures of the print order rearrangement processing performed in step S1108 in FIG. 13 by the rearrangement unit 1502. Processing in steps S1401 to S1405 is executed by the MFP control unit 15.

As described above, the MFP control unit 15 includes hardware resources such as a CPU, a ROM, and a RAM as well as software resources.

In step S1401, the acquisition unit 1501 of the job regeneration unit 192 acquires the number of times each file references the global reusable object.

Since the global reusable objects A and B are used in the first to the third files, the number of times of reference is three. On the other hand, the number of times of reference is two for each of the global reusable objects C and D. In step S1402, the acquisition unit 1501 acquires the number of times the global reusable objects is referenced and determines the global reusable object having the smallest number of times of reference as the reference object of the reusable objects. In this case, the global reusable object C is set as the reference reusable object.

Next, in step S1403, the rearrangement unit 1502 rearranges the file so that the file using the reference global reusable object is set as the first file.

In the case in FIG. 15, either of the files 1 and 3, which use the global reusable object C, is rearranged to be the first file.

Thus, when the rearrangement processing is completed, the print order will be either "file 1→3→2" or "file 3→1, 2".

In step S1404, since the printing of the files 1 and 3 is performed consecutively, the rearrangement unit 1502 determines the combination of the print order whether it is to be file 1→3→2 or file 3→1→2.

In step S1405, the rearrangement unit 1502 determines whether the rearrangement processing is completed based on information of whether the file to be rearranged exists. If the rearrangement unit 1502 determines that the rearrangement of the files is not yet completed (NO in step S1405), then the process returns to step S1403.

On the other hand, if the rearrangement unit 1502 determines that the rearrangement of the files is completed (YES in step S1405), then the process ends.

If the files illustrated in FIG. 14 are processed according to the flowchart illustrated in FIG. 17, the acquisition unit 1501 determines the global reusable object having the second smallest number of times of reference as the reference point to determine the next reference point (step S1402).

Since the number of times of reference of the global reusable object D is twice and is the smallest number, the global reusable object D will be the reference point of this time. Since the global reusable object D is used in the files 1 and 2 as illustrated in FIG. 14, the files 1 and 2 will be arranged so that the file 2 is processed after the file 1 or vice versa. Accordingly, although the print order has been temporarily determined as either file 1→3→2 or file 3→1→2 according to the process in step S1403, the print order will be finally determined as file 3→1→2 according to step S1404.

Since the global reusable objects A and B are used in all files, the print order of the files is not changed by such objects. In the illustration in FIG. 15, if the left side of the arrow (not rearranged) is compared with the right side (rearranged according to the generated global reusable object life time table), it can be seen that the global reusable object C is not included in the file 2. This is because the global reusable object C is deleted by the object management unit 193 when the print output of the file 1 is completed.

According to the present embodiment, the life time of the global reusable objects is reduced by rearranging the print order of the files according to the use order of the global reusable objects. Accordingly, the allocated region of memory can be reduced and performance can be improved.

According to the first exemplary embodiment, a print job is divided into files and then, according to the use order of the global reusable objects, the print order of the files is rearranged. According to a second exemplary embodiment of the present invention, the global reusable objects are set again according to the use order of the reusable objects, and the print order of the records is rearranged accordingly.

Figure 18:
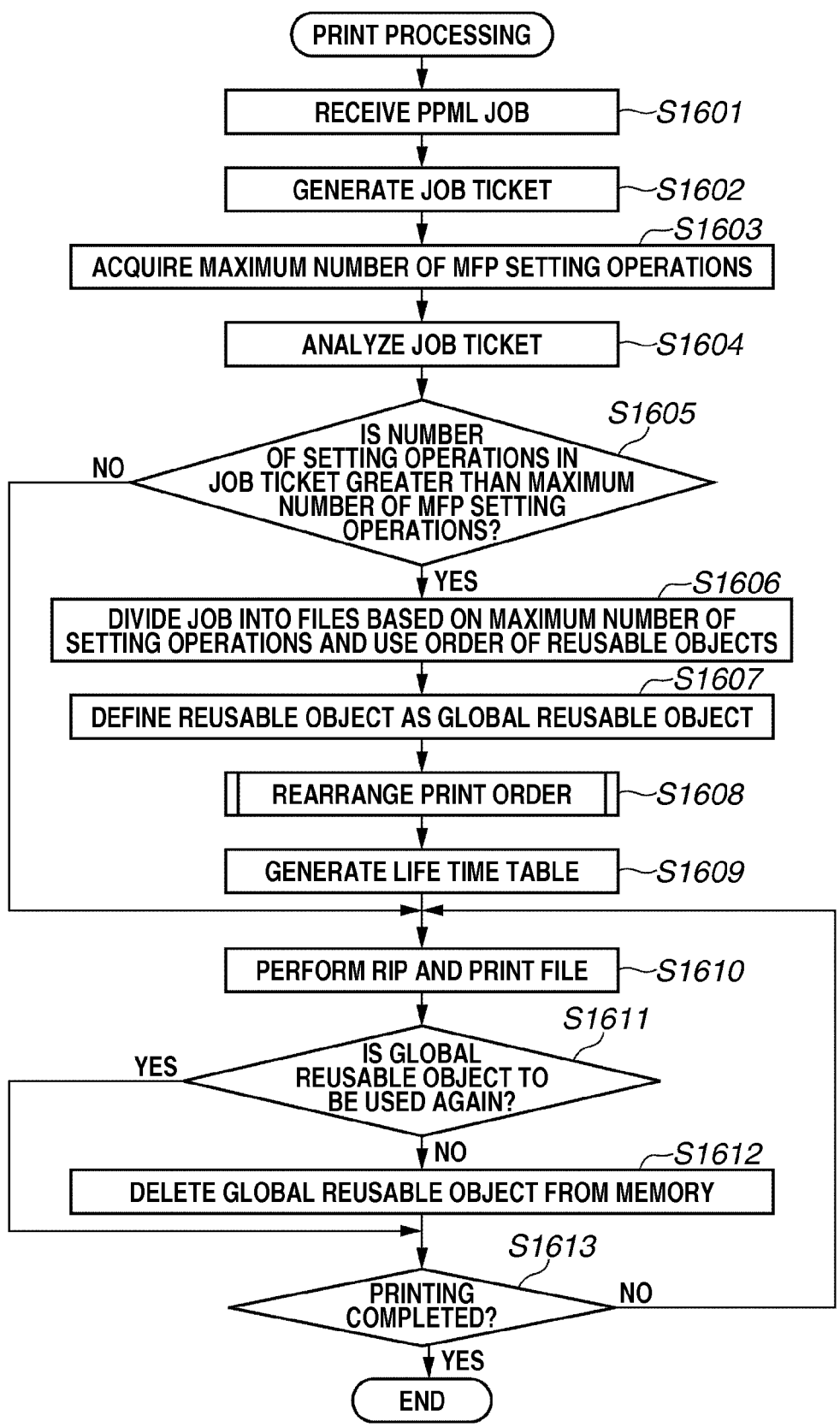
FIG. 18 is a flowchart illustrating an example of a job processing procedure by the image forming apparatus according to an exemplary embodiment of the present invention.

FIG. 18 is a flowchart illustrating an example of a job processing procedure by the image forming apparatus according to the present embodiment. Processing in steps S1601 to S1613 are executed by the MFP control unit 15 when a PPML job is submitted by a driver running on the host computer 2 or a submission tool. As described above, the MFP control unit 15 includes hardware resources such as a CPU, a ROM, and a RAM as well as software resources.

In step S1601, the input job management unit 151 receives a PPML job from the host computer 2. In step S1602, the job generation unit 154 generates a job ticket using the received PPML job and stores the generated job ticket in the memory 16*a*.

In step S1603, the output job management unit 181 acquires the maximum number of subset finishing operations set in the MFP 1. The maximum number is stored in the memory 16 in advance.

In step S1604, the output job control unit 182 extracts the total number of setting operations described in the job ticket. Before the extraction, the job analysis unit 183, the binder analysis unit 184, the document analysis unit 185, and the page analysis unit 186 analyze the generated job ticket.

In step S1605, the job division unit 191 determines whether the total number of the setting operations described in the job ticket is greater than the maximum number of the subset finishing operations that can be set for the MFP 1. If the job division unit 191 determines that the total number of setting operations is greater than the maximum number of the subset finishing operations (YES in step S1605), the process proceeds to step S1606.

In step S1606, the job division unit 191 divides the job into files according to the maximum number of setting operations of the MFP 1 and the use order of the reusable objects. In step S1607, the job regeneration unit 192 defines a reusable object which can be commonly used among the files as a global reusable object. In step S1608, the print order of each file is rearranged according to the use order of the global reusable object.

In step S1609, the job regeneration unit 192 generates the global reusable object life time table, which includes information of the files that include the global reusable object (i.e., the first file and the last file that include the global reusable object). Further, the object management unit 193 manages the life time table illustrated in FIG. 14 that includes information of the object life time and generated by the job regeneration unit 192. The table is stored in the memory 16.

In step S1610, each file generated by the job regeneration unit 192 is converted (RIPped) by the image processing/RIP unit 17 into printable raster data and subsequently stored in the memory 16b together with image information of the corresponding page. Timing of printing of the raster data stored in the memory 16b is scheduled by the device management unit 188. The data is output to the printer 21 to be printed.

In step S1611, the object management unit 193 refers to the global reusable object life time table and determines whether the global reusable object used in a file is to be used again in the subsequent file. If the object management unit 193 determines that the global reusable object is not to be used again in the subsequent file (NO in step S1611), the process proceeds to step S1612. In step S1612, the object management unit 193 deletes the global reusable object which is not to be used again from the memory 16b.

In step S1613, the MFP control unit 15 determines whether the printing of the files is completed. If the MFP control unit 15 determines that the printing is completed (YES in step S1613), then the process ends. If the MFP control unit 15 determines that the printing is not yet completed (NO in step S1613), then the process returns to step S1610 and the print processing is repeated.

On the other hand, if the job division unit 191 determines that the total number of the setting operations is not greater than the maximum number of the subset finishing operations (NO in step S1605), then the process proceeds to step S1610. Since the division processing of the job into files is not necessary, the image processing/RIP unit 17 converts the object included in the job into printable raster data (performs RIP). Then, the raster data converted by the image processing/RIP unit 17 is stored in the memory 16b together with image information of the corresponding page. After then, according to the print timing scheduled by the device management unit 188, the data is output from the printer 21. Details of the job processing performed in step S1606 will be described in detail below.

FIG. 19 illustrates rearrangement processing of a print job by the image forming apparatus according to the present embodiment. The present embodiment is different from the first exemplary embodiment as the print order of the records is rearranged according to the use order of the reusable object performed in step S1608.

The example illustrated in FIG. 19 is a case where the maximum number of the subset finishing operations is set to 5 (5 records) and the print job is divided into files accordingly.

The state of the files on the left side of the arrow in FIG. 19 illustrates a case where the files are printed without the implementation of the print order rearrangement processing. Out of the reusable objects A to F, the objects A to D are defined as the global reusable objects.

For this reason, the number of the setting operations for the global reusable objects used among files is increased and, accordingly, the used memory region is increased. Further, although the global reusable object C is used only in the files 1 and 3, it also remains in the file 2. Thus, unnecessary memory region is used.

According to the present embodiment, in order to effectively use the memory resources of the image forming apparatus, the change processing of the print order will be performed as described below.

Figure 20:
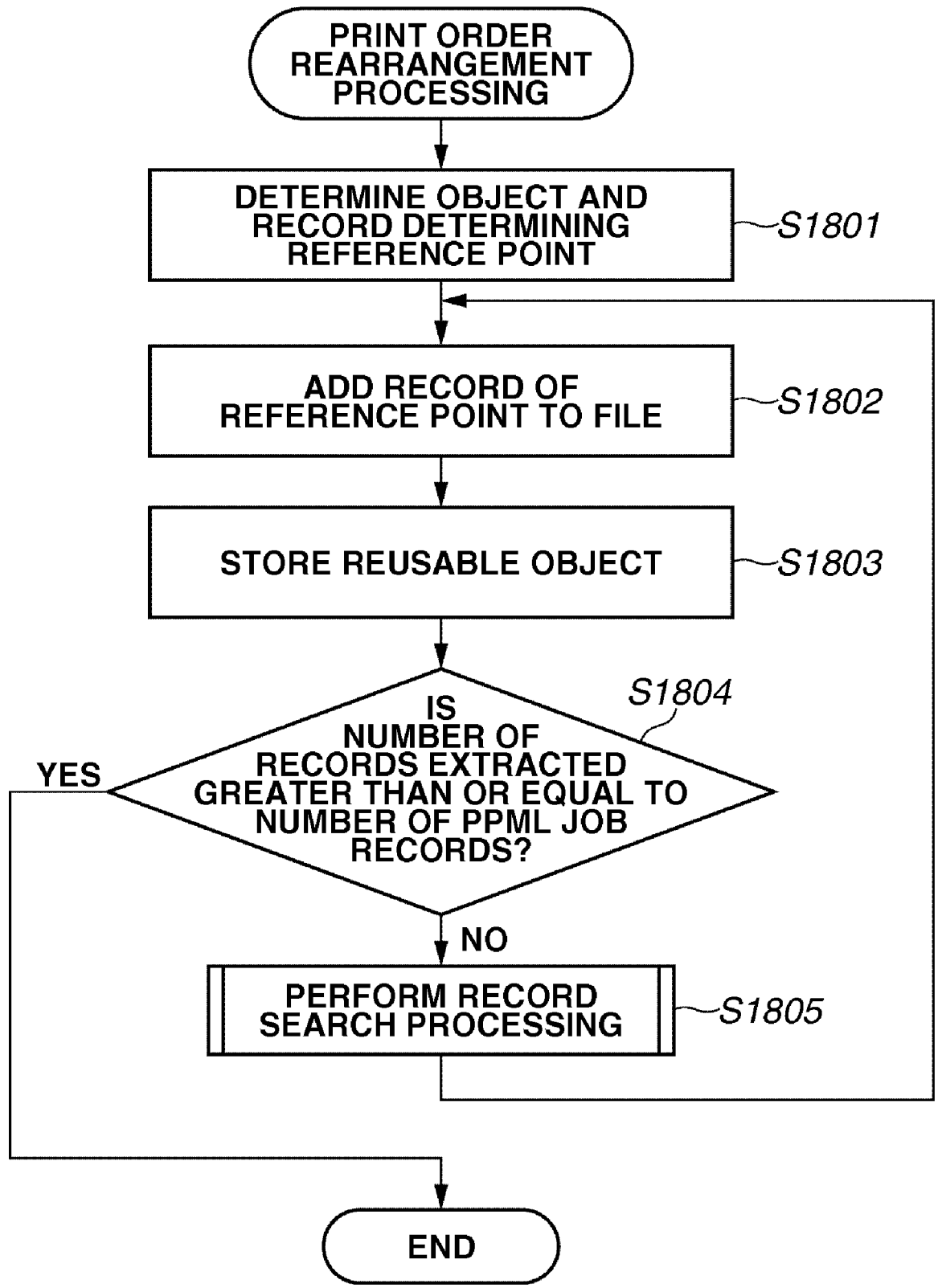
FIG. 20 is a flowchart illustrating an example of a job processing procedure by the image forming apparatus according to an exemplary embodiment of the present invention.

FIG. 20 is a flowchart illustrating an example of a job processing procedure by the image forming apparatus according to the present embodiment. The file print order rearrangement processing is performed by the job division unit 191 and the job regeneration unit 192.

When a PPML job is submitted by a driver running on the host computer 2 or a submission tool, each processing in steps S1801 to S1805 in the flowchart is executed by the MFP control unit 15. Further, as described above, the MFP control unit 15 includes hardware resources such as a CPU, a ROM, and a RAM as well as software resources.

In step S1801, the job division unit 191 performs reference point determination processing used for determining a record that can be a reference point for the division processing. According to the present embodiment, as illustrated in FIG. 19, the reference point is described as "reusable object A, record 1".

In step S1802, the job regeneration unit 192 adds the determined record of the reference point to a file. In FIG. 19, the record 1 is added to file 1 as a division-completed file, and the result is stored in the memory 16b.

In step S1803, the object management unit 193 acquires information from the job regeneration unit 192 that the reusable objects used for the reference point record are the reusable objects A and F. Then, the object management unit 193 stores the acquired reusable objects in the memory 16b as the reusable objects to be used in another file and manages the stored reusable objects. In this way, the reusable objects used in common among the additional records can be managed.

In step S1804, the rearrangement unit 1502 determines whether the number of the extracted records is equal to or greater than the number of the records of the PPML job ("5" in this case). If the rearrangement unit 1502 determines that the number of the extracted records is equal to or greater than 5, since the arrangement of the records to the files is completed (YES in step S1804), the division processing ends.

On the other hand, if the rearrangement unit 1502 determines that the number of the extracted records is smaller than 5, since the arrangement of the records to the files is not yet completed (NO in step S1804), the process proceeds to step S1805. In step S1805, the job regeneration unit 192 performs search processing and determines a record to be used in the file. Details of the search processing will be described referring to FIG. 21 below.

Figure 21:
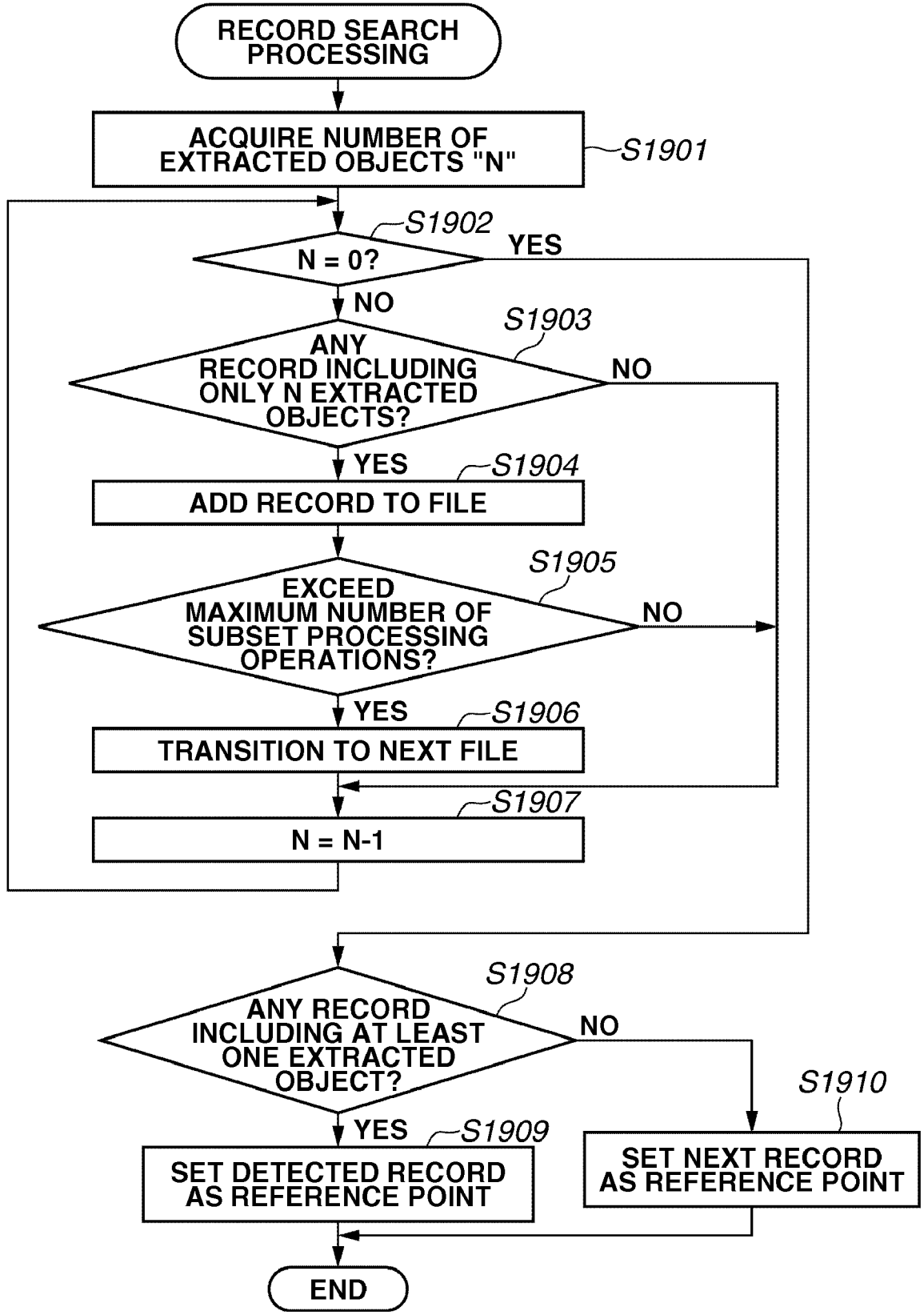
FIG. 21 is a flowchart illustrating an example of job processing procedure by the image forming apparatus according to an exemplary embodiment of the present invention.

FIG. 21 is a flowchart illustrating an example of a job processing procedure by the image forming apparatus according to the present embodiment. The flowchart provides detailed description of the record search processing in step S1805 in FIG. 20. When a PPML job is submitted by a driver running on the host computer 2 or a submission tool to the MFP 1, each step in steps S1901 to S1910 in the flowchart is executed by the MFP control unit 15. Further, as described above, the MFP control unit 15 includes hardware resources such as a CPU, a ROM, and a RAM as well as software resources.

In step S1901, the acquisition unit 1501 acquires the number of extraction-completed objects N that is currently extracted from the object management unit 193. In step S1902, the extraction unit 1503 determines whether the number of the extraction-completed objects N equals "0". At this stage, as illustrated in FIG. 19, since the reusable objects A and F are the extraction-completed objects, the number of the extraction-completed objects N is 2. Thus, the extraction unit 1503 determines that the number of the extraction-completed objects N is not "0" (NO in step S1902), and the process proceeds to step S1903.

In step S1903, the extraction unit 1503 searches whether a record that uses only the extracted reusable objects A and F exists. If such a record is detected by the extraction unit 1503 (YES in step S1903), the process proceeds to step S1904. In step S1904, the insertion unit 1504 adds the record to the file.

If the reference record is record 1 in FIG. 19, a record that satisfies such a condition is not detected (NO in step S1903), and the process proceeds to step S1907.

In step S1907, the extraction unit 1503 subtracts "1" from the number of the extraction-completed objects N and obtain "1". Then the process returns to step S1902.

After the record is added to the file by the insertion unit 1504 in step S1904, then in step S1905, the extraction unit 1503 determines whether the total number of the subset finishing operations of all the records included in the file is greater than the maximum number of the subset finishing operations set in the MFP 1. If the extraction unit 1503 determines that the total number of the subset finishing operations of all the records is greater than the maximum number of the subset finishing operations (YES in step S1905), the process proceeds to step S1906.

In step S1906, the job regeneration unit 192 generates a new file (a next file 2). In step S1907, the extraction unit 1503 subtracts "1" from the number of the extraction-completed objects N, and the process returns to step S1902.

On the other hand, in step S1905, if the extraction unit 1503 determines that the total number of the subset finishing operations does is not greater than the maximum number of the subset finishing operations (NO in step S1905), the process proceeds to step S1907. In step S1907, the extraction unit 1503 subtracts "1" from the number of the extraction-completed objects N and obtain "1". Then, the process returns to step S1902 and an object that is to be included in the file is searched.

Since the number of the extraction-completed objects N is currently "1", the process proceeds to step S1903. In step S1903, a record that includes only one record, which is either the extraction-completed object A or F, is searched. Since the extraction unit 1503 is unable to detect a record that satisfies such a condition (NO in step S1903), the process proceeds to step S1907. In step S1907, the number of the extraction-completed objects N will be "0", and the process returns to step S1902.

In step S1902, the extraction unit 1503 determines that the number of the extraction-completed objects N is "0", and the process proceeds to step S1908.

If the number of the extraction-completed objects N is "0", it means that all the records that include only the extraction-completed objects are extracted. In step S1908 and later, extraction processing of a record including an extraction-completed object will be performed.

Thus, in step S1908, the extraction unit 1503 determines whether a record including at least one of the extraction-completed objects A and F is detected. In this case, as illustrated in FIG. 19, record 4 includes the extraction-completed object A. Thus, in step S1908, the extraction unit 1503 determines that a record including one of the extraction-completed objects A and F is detected (YES in step S1908), and the process proceeds to step S1909.

In step S1909, the extraction unit 1503 sets the detected record 4 as a new reference point, and then the process ends. The process then proceeds to step S1802 in FIG. 20.

In step S1908, if the extraction unit 1503 determines that a record including one of the extraction-completed objects A and F is not detected (NO in step S1908), the process proceeds to step S1910.

In step S1910, the insertion unit 1504 determines the next record as a new reference point, and then the process ends. The process then proceeds to step S1802 in FIG. 20.

According to the case described above, in step S1802 in FIG. 20, the record 4 is newly added to the file. In step S1803, the object management unit 193 stores and manages the reusable objects A and C used in the record 4 as the reusable objects to be used in the current file.

At this time, the records in the file 1 managed by the object management unit 193 are the records 1 and 4. Thus, the reusable objects will be in a state shown by the first file 1 illustrated on the right side of the arrow in FIG. 19 including the extracted reusable objects A, F, and C.

Similarly, by performing the division processing including the rearrangement of the records illustrated in FIGS. 20 and 21, the files shown on the right side of the arrow in FIG. 19 are obtained. In other words, the first file including five records (i.e., records 1, 4, 12, 5, and 11) and the second file including five records (i.e., records 9, 3, 6, 10, and 13) are obtained.

Similarly, the third file including five records (i.e., records 14, 15, 2, 7, and 8) are obtained.

Further, the print order rearrangement processing according to the use order of the global reusable objects described in the first exemplary embodiment is performed for the files and the global reusable objects. However, the arrangement of the files and the global reusable objects is unchanged even if the rearrangement processing is applied in the case of the second exemplary embodiment.

According to the first exemplary embodiment, since the job is not divided considering the use order of the reusable objects, the number of the global reusable objects used in the files after the job is divided into the files is not considered. Thus, the memory resources are wasted by the objects that are set and kept as global reusable objects.

However, as described in the second exemplary embodiment, by performing the division processing according to the use order of the reusable objects, three global reusable objects (A, B, and F) are set in the second exemplary embodiment while four global reusable objects (A, B, C, and D) are set in the first exemplary embodiment. Thus, printing can be performed by setting only three global reusable objects according to the second exemplary embodiment.

According to the present embodiment, the number of the global reusable objects is reduced by rearranging the print order of the records according to the use order of the global reusable objects. Accordingly, the allocated region of memory can be reduced and performance can be improved.

According to the first and the second exemplary embodiments, the division processing is performed when the number of the subsequent stage processing operations set for a PPML job is greater than the maximum number of the subset finishing operations of the MFP. Further, according to the first and the second exemplary embodiments, performance of the print processing of the image forming apparatus is improved by redefining the reusable objects as global reusable objects and rearranging the print order.

However, regardless of the division processing, by rearranging the print order of the records according to the use order of the reusable objects, the period of time the memory is used can be reduced and performance can be improved.

Rearrangement processing of the print order of records according a third exemplary embodiment of the present invention will now be described referring to FIGS. 22 and 23.

Figure 22:
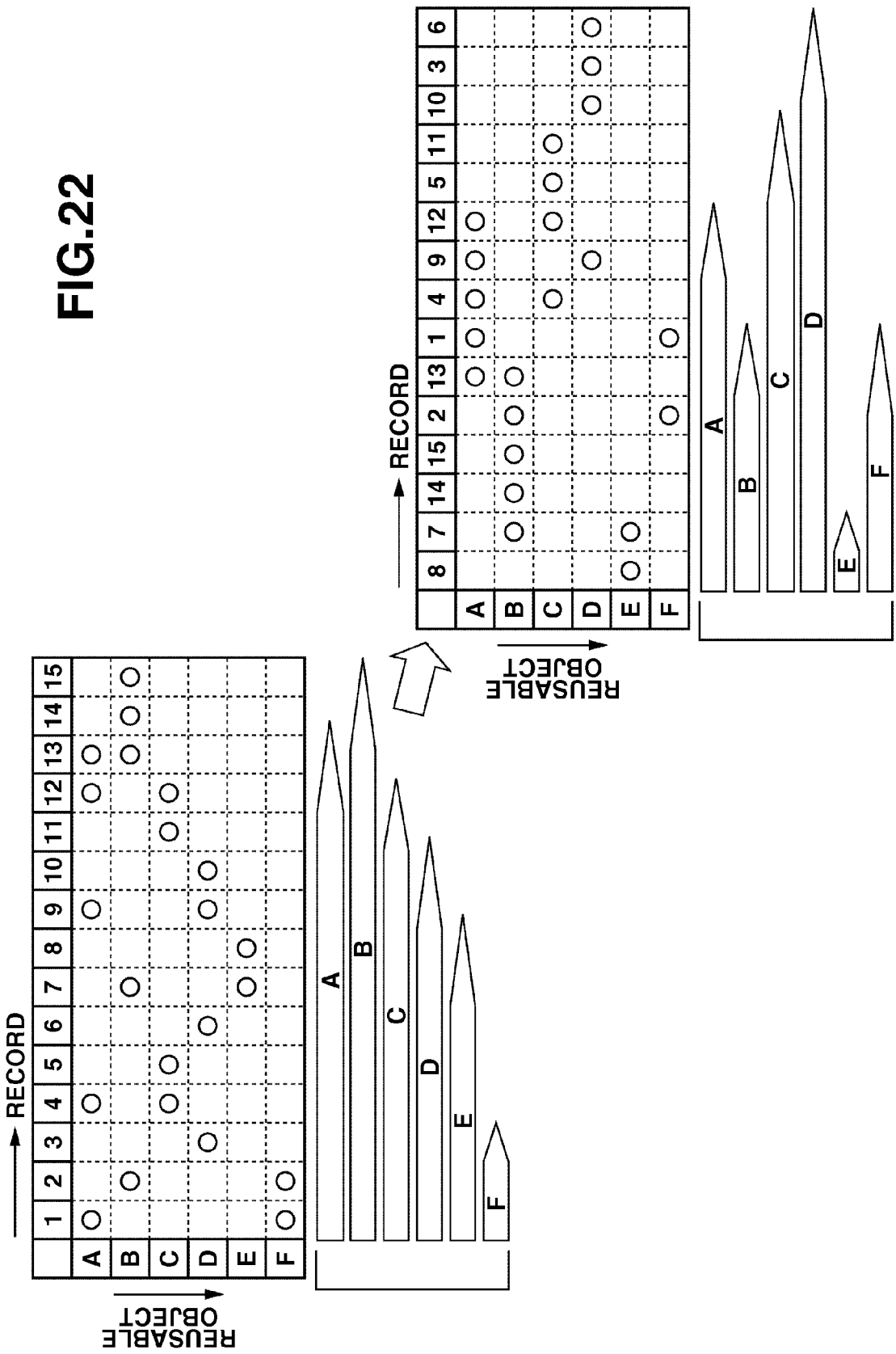
FIG. 22 illustrates a memory state when a job is processed by the image forming apparatus according to an exemplary embodiment of the present invention.

FIG. 22 illustrates a memory state when a job is processed by the image forming apparatus according to the present embodiment. FIG. 22 includes a correspondence table of reusable objects used in records and the period of time the memory is used by the reusable objects.

In FIG. 22, the left side of the arrow illustrates an output example without the implementation of the rearrangement of the print order of the records. The first record in which the reusable object A is used is record 1 and the last record is record 13. Thus, the reusable object A is to be stored in the memory 16*b* until the printing of the record 13 is completed.

Further, the first record in which the reusable object B is used is record 2 and the last record it is used is record 15. Thus, the reusable object B is to be stored in the memory 16*b* until the printing of the record 15 is completed.

As described above referring to the PPML job structure illustrated in FIG. 12, declaration of the reusable object of the PPML job is performed.

When the MFP 1 receives the PPML job, it performs RIP of the declared reusable object.

Thus, when the acquisition unit 1501 of the job regeneration unit 192 calculates the life time of each reusable object, a rasterized image of each reusable object is generated from the record 1.

Thus, if the objects are printed without consideration of the life time, the life time of the reusable objects will be 13 record sections for the reusable object A, 15 for the object B, 12 for the object C, 10 for the object D, 8 for the object E, and 2 for the object F. Consequently, the total life time will be 60 record sections.

Next, the record rearrangement processing of the present embodiment will be described referring to FIG. 23.

Figure 23:
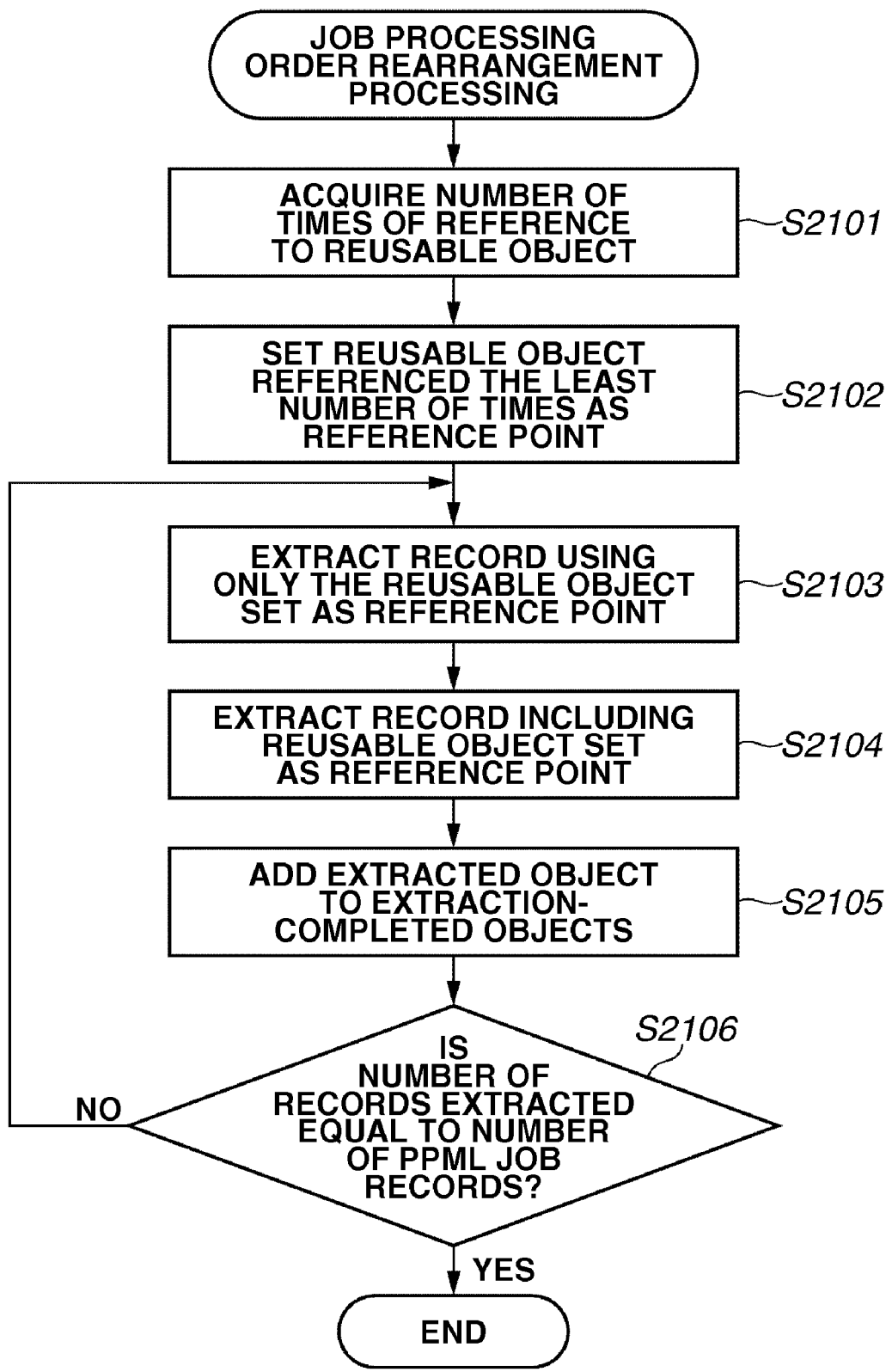
FIG. 23 is a flowchart illustrating an example of a job processing procedure by the image forming apparatus according to an exemplary embodiment of the present invention.

FIG. 23 is a flowchart illustrating an example of a job processing procedure by the image forming apparatus according to the present embodiment. The flowchart illustrates an example of a record rearrangement processing procedure performed by the job regeneration unit 192. Processing in steps S2101 to S2106 is executed by the job regeneration unit 192 controlled by the MFP control unit when a PPML job is submitted by a driver running on the host computer 2 or a submission tool. As described above, the MFP control unit 15 includes hardware resources such as a CPU, a ROM, and a RAM as well as software resources.

In step S2101, the acquisition unit 1501 of the job regeneration unit 192 acquires the number of times each reusable object is referenced. According to the case illustrated in FIG. 22, since the reusable object A is used in records 1, 4, 9, 12, and 13, the number of times of reference is five. Similarly, the number of times of reference for other reusable objects is obtained. Accordingly, the number of times of reference of the reusable object B is five, the objects C and D is four, and the objects E and F is two.

In step S2102, the acquisition unit 1501 extracts the reusable object having the smallest number of times of reference as a reference point. In this case, since the number of times of reference of the reusable objects E and F is two and the smallest, the reference point may be either the reusable object E or F. This time, however, the reference point is temporarily determined as the reusable object E.

In step S2103, the extraction unit 1503 extracts a record that includes only the reusable object E being the reference point. Then, according to the example illustrated in FIG. 22, record 8 is extracted.

In step S2104, the extraction unit 1503 extracts a record that includes the reusable object E. According to the example illustrated in FIG. 22, record 7 is extracted.

Since the record 7 includes the reusable object B which is used in other records, in step S2105, the extraction unit 1503 adds the reusable object B to the list of the extraction-completed objects.

In step S2106, the extraction unit 1503 determines whether processing of all the records is completed. If the extraction unit 1503 determines that processing of all the records is completed (YES in step S2106), the process ends.

On the other hand, in step S2106, if the extraction unit 1503 determines that processing of all the records is not yet completed (NO in step S2106), the process returns to step S2103.

In step S2103, a record that includes only the extracted reusable object B is extracted. In this case, records 14 and 15 are extracted. Next, in step S2104, the extraction unit 1503 extracts a record that includes the reusable object B. Accordingly, records 2 and 13 are extracted.

In this case, since the record 2 includes the reusable object F as well as the reusable object B, in step S2105, the extraction unit 1503 adds the reusable object F to the list of the extraction-completed objects, and then extracts the record 1 that uses the reusable object F.

If the record rearrangement is performed in this way, the print order illustrated on the right side of the arrow in FIG. 22 is determined. According to this example, the life time of the reusable objects is 10 record sections for the reusable object A, 6 for the object B, 12 for the object C, 15 for the object D, 2 for the object E, and 7 for the object F. Thus, the total number of the record sections will be 52.

According to the present embodiment, since the total number of the records sections before the rearrangement processing is 60, it is understood that the rearrangement processing has been effective in reducing 8 record sections of the life time of the reusable objects.

FIG. 24 is a memory map of a storage medium configured to store various types of data processing programs which can be read out by the image forming apparatus according to an exemplary embodiment of the present invention.

According to one aspect of the present invention, the life time of the global reusable objects is reduced by rearranging the print order of the files according to the use order of the global reusable objects. Accordingly, the region of the memory allocated for the objects can be reduced.

According to another aspect of the present invention, the number of the global reusable objects is reduced by rearranging the print order of the records according to the use order of the global reusable objects. Accordingly, the region of the memory allocated for the objects can be reduced.

According to still another aspect of the present invention, by rearranging the print order of the records and reducing the life time of the reusable objects, the period of time the memory allocated for the objects is used can be reduced.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-004640 filed Jan. 13, 2009, which is hereby incorporated by reference herein in its entirety.

What is claimed is:

1. An apparatus comprising:
a division unit configured to divide a print job into a plurality of data pieces;
a definition unit configured to define an object used for each of the divided data pieces as a reusable object which can be used by each of the data pieces;
a storage unit configured to store a life time of the defined reusable object;
a deletion unit configured to delete the stored reusable object after printing based on the print job is completed;
an acquisition unit configured to acquire a number of subsequent stage processing operations set for the print job; and
a rearrangement unit configured to rearrange print order of the divided data pieces according to use order of the reusable object of each of the divided data pieces,
wherein the division unit divides the print job into a plurality of data pieces based on the acquired number of processing operations.

2. The apparatus according to claim 1, wherein the rearrangement unit includes:
a number of times acquisition unit configured to acquire a number of times the defined reusable object is referenced from each of the data pieces, and
a reference point determination unit configured to determine a data piece with a smallest number of times of reference of the acquired reusable object as a reference point, and
wherein the rearrangement unit rearranges the data of the determined reference point at the top of the print order.

3. The apparatus according to claim 1, further comprising:
a second division unit configured to divide the print job into a plurality of data pieces according to use order of the object to be reused included in the print job, and
a second definition unit configured to define the object used in each of the data pieces divided by the second division unit as a reusable object.

4. The apparatus according to claim 2, further comprising a second rearrangement unit configured to rearrange print order of the divided file divided by the division unit according to the use order of the reusable object.

5. The apparatus according to claim 3, wherein the second division unit includes:
a determination unit configured to determine a record for dividing the print job,
a management unit configured to manage a reusable object used in common among records used by the determined record, and
an extraction unit configured to extract a record using the managed object.

6. The apparatus according to claim 2, wherein the rearrangement unit includes:
a second number of times acquisition unit configured to acquire a number of times the defined reusable object is referenced from each file, and
a second reference point determination unit configured to determine a file with a smallest number of times of reference of the reusable object acquired by the second number of times acquisition unit as a reference point, and
wherein the rearrangement unit rearranges the file corresponding to the reference point determined by the second reference point determination unit at the top of the print order.

7. The apparatus according to claim 2, wherein the rearrangement unit includes:
a second number of times acquisition unit configured to acquire a number of times an object used in common among records is referenced;
a second reference point determination unit configured to determine an object with a smallest number of times of reference acquired by the second number of times acquisition unit as a reference point;
an extraction unit configured to extract a record using the object determined by the second reference point determination unit; and
a designation unit configured to designate print order of records according to an order of records extracted by the extraction unit.

8. The apparatus according to claim 1, wherein the storage unit stores a start point, an end point, and a use period of the reusable object used in a file.

9. An apparatus comprising:
a division unit configured to divide a print job into a plurality of data pieces;
a definition unit configured to define an object used for each of the divided data pieces as a reusable object which can be used by each of the data pieces;
a storage unit configured to store a life time of the defined reusable object; and
a deletion unit configured to delete the stored reusable object after printing based on the print job is completed,
wherein the division unit includes:
a maximum number acquisition unit configured to acquire a maximum number of subsequent stage processing operations which can be set and stored by the apparatus, and
a record number determination unit configured to determine a number of records which can be included in the data to be divided by the division unit based on the acquired maximum number, and
wherein the division unit divides the print job into a plurality of data pieces according to the determined number of records.

10. A method for an image forming apparatus for receiving and processing a print job which can designate subsequent stage processing for each page, the job processing method comprising:
dividing the print job into a plurality of data pieces;
defining an object used for each of the divided data pieces as a reusable object which can be used by each of the data pieces;
storing a life time of the defined reusable object;
deleting the reusable object based on the stored life time after printing based on the print job is completed;
acquiring a number of subsequent stage processing operations set for the print job;
rearranging print order of the divided data according to use order of the reusable object of each of the divided data pieces; and
dividing the print job into a plurality of data pieces based on the number of processing operations.

11. The method according to claim 10, further comprising:
acquiring a number of times the defined reusable object is referenced from each of the data pieces;
determining a data piece with a smallest number of times of reference of the acquired reusable object as a reference point; and
rearranging the data of the determined reference point at the top of the print order.

12. The method according to claim 10, further comprising:
dividing the print job into a plurality of data pieces according to use order of the object to be reused included in the print job, and
defining the object used in each of the divided data pieces as a reusable object.

13. The method according to claim 11, further comprising rearranging print order of the divided file according to the use order of the reusable object.

14. The method according to claim 12, further comprising:
determining a record for dividing the print job into a plurality of pieces;
managing a reusable object used in common among records used by the determined record; and
extracting a record using the managed object.

15. The method according to claim 11, further comprising:
acquiring a number of times the defined reusable object is referenced from each file;
determining a file with a smallest number of times of reference of the acquired reusable object as a reference point; and
rearranging the file corresponding to the determined reference point at the top of the print order.

16. The method according to claim 11, further comprising:
acquiring a number of times an object used in common among records is referenced;
determining an object with a smallest number of times acquired as a reference point;
extracting a record using the determined object; and
designating print order of records according to the extracted order.

17. The method according to claim 10, further comprising storing a start point, an end point, and a use period of the reusable object used in a file.

18. A method for an image forming apparatus for receiving and processing a print job which can designate subsequent stage processing for each page, the job processing method comprising:
dividing the print job into a plurality of data pieces;
defining an object used for each of the divided data pieces as a reusable object which can be used by each of the data pieces;
storing a life time of the defined reusable object;
deleting the reusable object based on the stored life time after printing based on the print job is completed;
acquiring a maximum number of subsequent stage processing operations which can be set and stored by the image forming apparatus;
determining a number of records which can be included in the data to be divided based on the acquired maximum number; and
dividing the print job into a plurality of data pieces according to the determined number of records.

19. A non-transitory computer-readable storage medium storing a computer-executable program for causing a computer to execute a method, the method comprising:
dividing a print job into a plurality of data pieces;
defining an object used for each of the divided data pieces as a reusable object which can be used by each of the data pieces;
storing a life time of the defined reusable object;
deleting the reusable object based on the stored life time after printing based on the print job is completed;
acquiring a number of subsequent stage processing operations set for the print job;
rearranging print order of the divided data according to use order of the reusable object of each of the divided data pieces; and
dividing the print job into a plurality of data pieces based on the number of processing operations.

20. A non-transitory computer-readable storage medium storing a control program for causing a computer to execute a method for receiving and processing a print job, the method comprising:
dividing the print job into a plurality of data pieces;
defining an object used in each of the divided data pieces as a reusable object which can be used from each of the data pieces;
storing a life time of the defined reusable object;
deleting the reusable object based on the stored life time after printing based on the print job is completed;
acquiring a maximum number of subsequent stage processing operations which can be set and stored by the image forming apparatus;
determining a number of records which can be included in the data to be divided based on the acquired maximum number; and
dividing the print job into a plurality of data pieces according to the determined number of records.

* * * * *